US012670866B2

(12) United States Patent
Bong

(10) Patent No.: US 12,670,866 B2
(45) Date of Patent: Jun. 30, 2026

(54) GATE DRIVER AND DISPLAY DEVICE INCLUDING THE SAME

(71) Applicant: LG Display Co., Ltd., Seoul (KR)

(72) Inventor: Junho Bong, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/948,085

(22) Filed: Nov. 14, 2024

(65) Prior Publication Data

US 2025/0218394 A1 Jul. 3, 2025

(30) Foreign Application Priority Data

Dec. 28, 2023 (KR) ........................ 10-2023-0195513

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0842* (2013.01); *G09G 2300/0861* (2013.01); *G09G 2310/0286* (2013.01); *G09G 2310/08* (2013.01); *G09G 2330/021* (2013.01); *G09G 2340/0435* (2013.01)

(58) Field of Classification Search
None
See application file for complete search history.

(56) References Cited

U.S. PATENT DOCUMENTS

2010/0260312 A1* 10/2010 Tsai ....................... G11C 19/00 377/64

FOREIGN PATENT DOCUMENTS

| | | | |
|---|---|---|---|
| KR | 10-2022-0093764 | A | 7/2022 |
| KR | 102469869 | B1 | 11/2022 |

* cited by examiner

*Primary Examiner* — Aneeta Yodichkas
(74) *Attorney, Agent, or Firm* — Seed Intellectual Property Law Group LLP

(57) ABSTRACT

A gate driver according to an embodiment of the present disclosure may include a plurality of dependently connected stages; and at least one of gate incoming circuits configured to selectively output one of a first start pulse corresponding to a high-frequency operation and a second start pulse corresponding to a low-frequency operation, wherein at least one of the plurality of stages are connected to the gate incoming circuit and receive one of the first start pulse and the second start pulse outputted by the gate incoming circuit.

18 Claims, 13 Drawing Sheets

GATE DRIVER AND DISPLAY DEVICE INCLUDING THE SAME

CROSS-REFERENCE TO RELATED APPLICATIONS

This application claims the priority of Korean Patent Application No. 10-2023-0195513 filed on Dec. 28, 2023, in the Korean Intellectual Property Office, the disclosure of which is incorporated herein by reference.

BACKGROUND

Technical Field

The present disclosure relates to a gate driver and a display device including the same.

Description of the Related Art

A display field for visually expressing electrical information signals has been rapidly developed as the information age has come in earnest. Therefore, various display devices, which are thin in thickness and light in weight and have excellent performances such as low power consumption, have been developed. Examples of the display devices may include a liquid crystal display (LCD) device, an organic light-emitting display (OLED) device, and the like.

The display device may include a drive circuit such as a data driver configured to supply data signals to a display panel on which pixel arrays for displaying an image and to data lines disposed on the display panel, a gate driver configured to sequentially supply gate signals to gate lines disposed in a display area, and a timing controller configured to control the data driver and the gate driver.

BRIEF SUMMARY

The present disclosure provides a gate driver, which is capable of independently controlling a driving frequency of a display area, and a display device including the same.

The present disclosure provides a gate driver, which is capable of reducing (e.g., minimizing) power consumption, and a display device including the same.

Technical features and characteristics of the present disclosure are not limited to those above-mentioned, and other features and characteristics, which are not mentioned above, can be clearly understood by those skilled in the art from the following descriptions.

A gate driver according to an embodiment of the present disclosure may include at least one of gate incoming circuits configured to selectively output any one of the plurality of dependently connected stages, a first start pulse corresponding to the high-frequency operation, and a second start pulse corresponding to the low-frequency operation.

A display device according to another embodiment of the present disclosure may include: a display panel including a display area; a plurality of dependently connected stages; at least one of gate incoming circuits configured to selectively output any one of a first start pulse corresponding to a high-frequency operation and a second start pulse corresponding to a low-frequency operation; and a controller configured to control a gate driver. In this case, at least one of the plurality of stages may be connected to the gate incoming circuit and receive any one of the first start pulse and the second start pulse outputted by the gate incoming circuit.

Other detailed matters of the example embodiments are included in the detailed description and the drawings.

According to the present disclosure, the two or more gate incoming circuits are connected to the gate driver and operated, such that the gate drivers may operate at different frequencies. For example, the gate incoming circuit operates some gate driver(s) at a high-frequency and operates some of the remaining gate driver(s) at a low frequency, such that the driving frequencies of the blocks included in the display area may be independently controlled.

According to the present disclosure, when the driving frequencies of the blocks included in the display area are independently controlled, the driving frequencies of some of the blocks are controlled as low frequencies, such that the consumption of power for displaying images may be reduced (e.g., minimized).

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
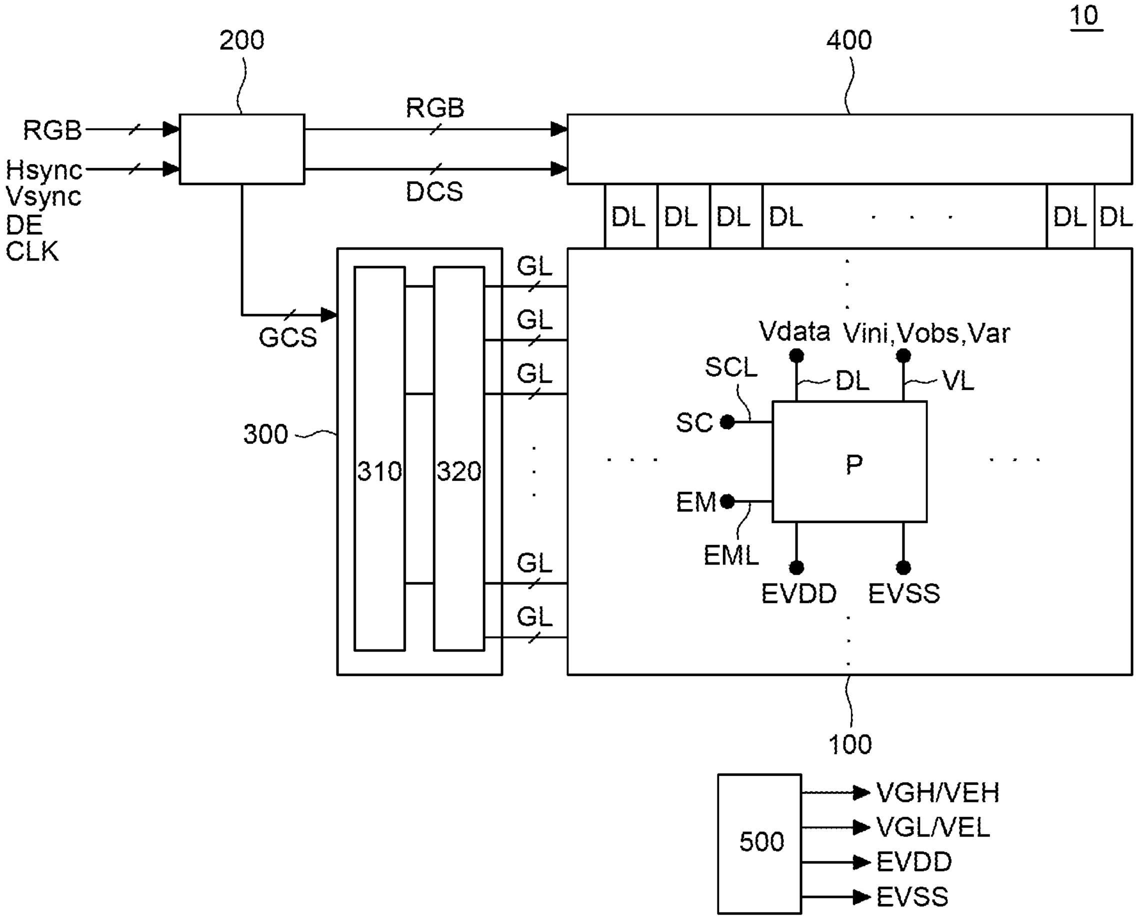
FIG. 1 is a block diagram illustrating a display device according to an embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two parts is described using the terms such as "on," "above," "below," \ and "next," at least one parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to example embodiments of the present disclosure will be described in detail with reference to accompanying drawings.

FIG. 1 is a block diagram schematically illustrating a display device according to the embodiment of the present disclosure.

With reference to FIG. 1, a display device 10 includes a display panel 100 including a plurality of pixels P, a controller 200, a gate driver 300 configured to supply gate signals to the plurality of pixels P, a data driver 400 configured to supply data signals to the plurality of pixels P, and a power source 500 configured to supply power to operate the plurality of pixels P, to the plurality of pixels P.

The display panel 100 includes a display area AA (see FIG. 2) in which the pixels P are positioned, and a non-display area NA (see FIG. 2) disposed to surround the display area AA, and the gate driver 300 and the data driver 400 are disposed in the non-display area NA.

In the display panel 100, a plurality of gate lines GL and a plurality of data lines DL intersect one another, and the plurality of pixels P are respectively connected to the gate lines GL and the data lines DL. Specifically, one pixel P is supplied with a gate signal from the gate driver 300 through the gate line GL, supplied with a data signal from the data driver 400 through the data line DL, and supplied with a high-potential drive voltage EVDD and a low-potential drive voltage EVSS from the power source 500.

In this case, the gate line GL supplies a scan signal SC and a light emission control signal EM, and the data line DL supplies a data voltage Vdata. In addition, according to various embodiments, the gate line GL may include a plurality of gate lines SCL configured to supply the scan signal SC, and a light emission control signal line EML configured to supply the light emission control signal EM. In addition, the plurality of pixels P may additionally include a power line VL and be supplied with a bias voltage Vobs and initialization voltages Var and Vini.

Figure 2:
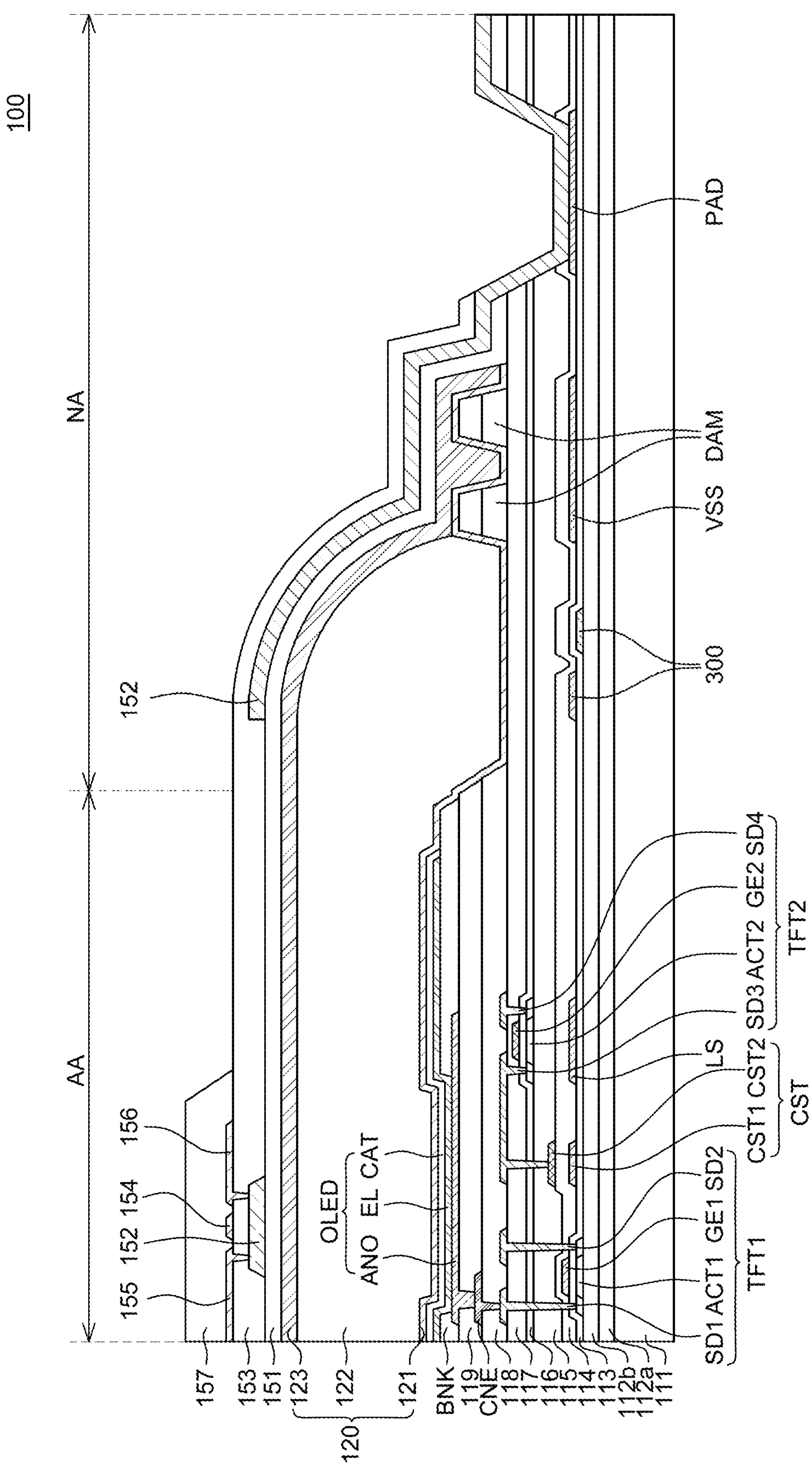
FIG. 2 is a cross-sectional view illustrating a layered shape of the display device according to the embodiment.

In addition, as illustrated in FIG. 2, the pixels P each include a light-emitting element OLED, and a pixel circuit configured to control an operation of the light-emitting element OLED. In this case, the light-emitting element OLED includes an anode electrode ANO, a cathode electrode CAT, and a light-emitting layer EL disposed between the anode electrode ANO and the cathode electrode CAT.

The pixel circuit includes a plurality of switching elements, a driving element, and a capacitor. In this case, the switching element and the driving element may be configured as thin-film transistors. The driving element of the pixel circuit adjusts a light emission amount of the light-emitting element OLED by controlling the amount of electric current to be supplied to the light-emitting element OLED on the basis of the data voltage. In addition, the plurality of switching elements operates the pixel circuit by receiving the scan signal SC supplied through the plurality of gate lines SCL and receiving the light emission control signal EM supplied through the light emission control line EML.

The display panel 100 may be implemented as a non-transmissive display panel or a transmissive display panel. The transmissive display panel may be applied to a transparent display device in which an image is displayed on a screen and an actual object in the background is visible. The display panel 100 may be manufactured as a flexible display panel. The flexible display panel may be implemented as an OLED panel using a plastic substrate.

The pixels P may be divided into a red pixel, a green pixel, and a blue pixel to implement colors. The pixels P may further include a white pixel. The pixels P each include the pixel circuit.

Touch sensors may be disposed on the display panel 100. A touch input may be sensed by using separate touch sensors or sensed through the pixels P. The touch sensors may be disposed, as on-cell type touch sensors or add-on type touch sensors, on the screen of the display panel. Alternatively, the touch sensors may be implemented as in-cell type touch sensors embedded in the display panel 100.

The controller 200 processes image data RGB, which are inputted from the outside, so that the image data RGB are suitable for the size and resolution of the display panel 100 and supplied to the data driver 400. The controller 200 generates a gate control signal GCS and a data control signal DCS by using synchronizing signals, e.g., a dot clock signal CLK, a data enable signal DE, a horizontal synchronizing signal Hsync, and a vertical synchronizing signal Vsync inputted from the outside. The controller 200 controls the gate driver 300 and the data driver 400 by supplying the generated gate control signal GCS and the generated data control signal DCS to the gate driver 300 and the data driver 400.

The controller 200 may be configured by being coupled to various processors, e.g., a micro-processor, a mobile processor, an application processor, and the like in accordance with the mounted device.

A host system may be any one of a television (TV) system, a set-top box, a navigation system, a personal computer (PC), a home theater system, a mobile device, a wearable device, and a vehicle system.

The controller 200 may control an operation timing of a display panel driver with a frame frequency of input frame frequency×i (i is a positive integer more than 0) Hz made by multiplying the input frame frequency by a factor of i. The input frame frequency is 60 Hz in the National Television Standards Committee (NTSC) and 50 Hz in the Phase-Alternating Line (PAL).

The controller 200 generates a signal to operate the pixel P at various refresh rates. That is, the controller 200 generates signals related to the operation of the pixel P so that the pixel P operates in a variable refresh rate (VRR) mode or operates to be able to switch between a first refresh rate and a second refresh rate. For example, the controller 200 may operate the pixel P at various refresh rates by simply changing a rate of a clock signal, generating a synchronizing signal to form a horizontal blank or a vertical blank, or operating the gate driver 300 in a mask manner.

On the basis of the timing signals Vsync, Hsync, and DE received from the host system, the controller 200 generates the gate control signal GCS for controlling an operation timing of the gate driver 300 and generates a data control signal DSC for controlling an operation timing of the data driver 400. The controller 200 synchronizes the gate driver 300 and the data driver 400 by controlling an operation timing of the display panel driver.

A voltage level of the gate control signal GCS outputted from the controller 200 may be converted into gate-on voltages VGL and VEL and gate-off voltages VGH and VEH by a non-illustrated level shifter, and the gate-on voltages VGL and VEL and the gate-off voltages VGH and VEH may be supplied to the gate driver 300. The level shifter converts a low-level voltage of the gate control signal GCS into a gate low voltage VGL and converts a high-level voltage of the gate control signal GCS into a gate high voltage VGH. The gate control signal GCS includes a start pulse and a shift clock.

The gate driver 300 supplies the scan signal SC to the gate line GL in response to the gate control signal GCS supplied from the controller 200. The gate driver 300 may be disposed at one side or two opposite sides of the display panel 100 in a gate-in-panel (GIP) manner.

The gate driver 300 sequentially outputs the gate signals to the plurality of gate lines GL under the control of the controller 200. The gate driver 300 may shift the gate signals by using a shift register and sequentially supply the signals to the gate lines GL.

In the organic light-emitting display device, the gate signals may include the scan signal SC and the light emission control signal EM. The scan signal SC includes a scan pulse that swings between the gate-on voltage VGL and the gate-off voltage VGH. The light emission control signal EM may include a light emission control signal pulse that swings between the gate-on voltage VEL and the gate-off voltage VEH.

The scan pulse is synchronized with the data voltage Vdata and selects the pixels P on the line to which data are to be written. The light emission control signal EM defines light emission times of the pixels P.

The gate driver 300 may include a light emission control signal driver 310 and at least one scan driver 320.

The light emission control signal driver 310 outputs the light emission control signal pulse in response to the start pulse and the shift clock from the controller 200 and sequentially shifts the light emission control signal pulse on the basis of the shift clock.

At least one scan driver 320 outputs a scan pulse in response to the start pulse and the shift clock from the controller 200 and shifts the scan pulse in accordance with the shift clock timing.

The data driver 400 converts the image data RGB into the data voltage Vdata in response to the data control signal DCS supplied from the controller 200 and supplies the converted data voltage Vdata to the pixel P through the data line DL.

FIG. 1 illustrates that the data driver 400 is disposed in one shape at one side of the display panel 100. However, the number of data drivers 400 and the arrangement position of the data driver 400 are not limited thereto.

That is, the data driver 400 may include a plurality of integrated circuits (ICs), and the plurality of data drivers 400 may be separated and disposed at one side of the display panel 100.

The power source 500 uses a direct current-direct current converter (DC-DC converter) and generate direct current (DC) power to operate the pixel array and the display panel driver of the display panel 100. The direct current-direct current converter may include a charge pump, a regulator, a buck converter, a boost converter, and the like. The power source 500 may receive a direct current input voltage applied from the non-illustrated host system and generate the direct current voltages such as the gate-on voltages VGL and VEL, the gate-off voltages VGH and VEH, the high-potential drive voltage EVDD, and the low-potential drive voltage EVSS. The gate-on voltages VGL and VEL and the gate-off voltages VGH and VEH are supplied to the non-illustrated level shifter and the gate driver 300. The high-potential drive voltage EVDD and the low-potential drive voltage EVSS are supplied in common to the pixels P.

FIG. 2 is a cross-sectional view illustrating a layered shape of the display device according to the embodiment.

FIG. 2 is a cross-sectional view including two switching thin-film transistors TFT1 and TFT2 and one capacitor CST. The two thin-film transistors TFT1 and TFT2 include a switching thin-film transistor including a polycrystalline semiconductor material or any one thin-film transistor among driving transistors, and an oxide thin-film transistor TFT2 including an oxide semiconductor material. In this case, the thin-film transistor including a polycrystalline semiconductor material is referred to as a polycrystalline thin-film transistor TFT1, and a thin-film transistor including an oxide semiconductor material is referred to as an oxide thin-film transistor TFT2.

The polycrystalline thin-film transistor TFT1 illustrated in FIG. 2 is an emission switching thin-film transistor connected to a light-emitting element OLED, and the oxide thin-film transistor TFT2 is any one switching thin-film transistor connected to the capacitor CST.

One pixel P includes the light-emitting element OLED, and a pixel driving circuit configured to apply a drive current to the light-emitting element OLED. The pixel driving circuit is disposed on a substrate 111, and the light-emitting element OLED is disposed on the pixel driving circuit. Further, an encapsulation layer 120 is disposed on the light-emitting element OLED. The encapsulation layer 120 protects the light-emitting element OLED.

The pixel driving circuit may refer to an array part of one pixel P including a thin-film driving transistor, a switching thin-film transistor, and a capacitor. Further, the light-emitting element OLED may refer to an array part configured to emit light and including an anode electrode, a cathode electrode, and a light-emitting layer disposed between the anode electrode and the cathode electrode.

In the embodiment, the thin-film driving transistor and at least one switching thin-film transistor uses an oxide semiconductor as an active layer. The thin-film transistor, which uses the oxide semiconductor material as the active layer, provides an excellent effect of blocking a leakage current with a relatively low manufacturing cost in comparison with the thin-film transistor that uses the polycrystalline semiconductor material as the active layer. Therefore, the pixel driving circuit according to the embodiment includes a thin-film driving transistor and at least one switching thin-film transistor made of an oxide semiconductor material in order to reduce power consumption and manufacturing costs.

All the thin-film transistors, which constitute the pixel driving circuit, may be implemented by using an oxide semiconductor material. Alternatively, only some of the switching thin-film transistors may be implemented by using an oxide semiconductor material.

However, the thin-film transistor using an oxide semiconductor material has difficulty in ensuring reliability, and the thin-film transistor using a polycrystalline semiconductor material provides a high operating speed and excellent reliability. Therefore, the embodiment includes both the switching thin-film transistor using the oxide semiconductor material and the switching thin-film transistor using the polycrystalline semiconductor material.

The substrate 111 may be implemented as a multi-layer made by alternately stacking organic films and inorganic films. For example, the substrate 111 may be implemented by alternately stacking organic films, such as polyimide, and inorganic films such as silicon oxide ($SiO_2$).

A lower buffer layer 112*a* is formed on the substrate 111. The lower buffer layer 112*a* may serve to block moisture or the like that may penetrate from the outside. The lower buffer layer 112*a* may be made by stacking silicon oxide ($SiO_2$) films or the like as a multilayer. An auxiliary buffer layer 112*b* may be further disposed on the lower buffer layer 112*a* to protect the elements from moisture penetration.

The polycrystalline thin-film transistor TFT1 is formed on the substrate 111. The polycrystalline thin-film transistor TFT1 may use a polycrystalline semiconductor as an active layer. The polycrystalline thin-film transistor TFT1 includes a first active layer ACT1, a first gate electrode GE1, a first source electrode SD1, and a first drain electrode SD2 that include channels through which electrons or positive holes move.

The first active layer ACT1 includes a first channel area, a first source area disposed at one side with the first channel area interposed therebetween, and a first drain area disposed at the other side.

The first source area and the first drain area are areas in which a true polycrystalline semiconductor material is doped with pentavalent or trivalent impurity ions, e.g., phosphorus (P) or boron (B) at predetermined concentrations so that the polycrystalline semiconductor material becomes a conductor. The first channel area maintains a true state of the polycrystalline semiconductor material and provides a path through which electrons or positive holes move.

Meanwhile, the polycrystalline thin-film transistor TFT1 includes the first gate electrode GE1 that overlaps the first channel area of the first active layer ACT1. A first gate insulation layer 113 is disposed between the first gate electrode GE1 and the first active layer ACT1. The first gate insulation layer 113 may be made of stacking inorganic layers such as a silicon oxide ($SiO_2$) film and a silicon nitride (SiNx) film as a single layer or multilayer.

In the embodiment, the polycrystalline thin-film transistor TFT1 has a top gate structure in which the first gate electrode GE1 is positioned above the first active layer ACT1. Therefore, a first electrode CST1, which is included in the capacitor CST, and a light-blocking layer LS, which is included in the oxide thin-film transistor TFT2, may be made of the same material as the first gate electrode GE1. The first gate electrode GE1, the first electrode CST1, and the light-blocking layer LS are formed by a single mask process, such that the number of mask processes may be reduced.

The first gate electrode GE1 is made of a metallic material. For example, the first gate electrode GE1 may be configured as a single layer or multilayer made of any one of molybdenum (Mo), aluminum (Al), chromium (Cr), gold (Au), titanium (Ti), nickel (Ni), neodymium (Nd), and copper (Cu) or an alloy thereof. However, the present disclosure is not limited thereto.

A first interlayer insulation layer 114 is disposed on the first gate electrode GE1. The first interlayer insulation layer 114 may be made of silicon oxide ($SiO_2$), silicon nitride (SiNx), or the like.

The display panel 100 may further include an upper buffer layer 115, a second gate insulation layer 116, and a second interlayer insulation layer 117 sequentially disposed on the first interlayer insulation layer 114. The polycrystalline thin-film transistor TFT1 includes the first source electrode SD1 and the first drain electrode SD2 formed on the second interlayer insulation layer 117 and respectively connected to the first source area and the first drain area.

The first source electrode SD1 and the first drain electrode SD2 may each be configured as a single layer or multilayer made of any one of molybdenum (Mo), aluminum (Al), chromium (Cr), gold (Au), titanium (Ti), nickel (Ni), neodymium (Nd), and copper (Cu) or an alloy thereof. However, the present disclosure is not limited thereto.

The upper buffer layer 115 may provide a base capable of forming a second active layer ACT2 by spacing the second active layer ACT2 of the oxide thin-film transistor TFT2, which is implemented by an oxide semiconductor material, from the first active layer ACT1 implemented by a polycrystalline semiconductor material.

The second gate insulation layer 116 covers the second active layer ACT2 of the oxide thin-film transistor TFT2. The second gate insulation layer 116 is implemented by an inorganic film because the second gate insulation layer 116 is formed on the second active layer ACT2 implemented by an oxide semiconductor material. For example, the second gate insulation layer 116 may be made of silicon oxide ($SiO_2$), silicon nitride (SiNx), or the like.

A second gate electrode GE2 is made of a metallic material. For example, the second gate electrode GE2 may be configured as a single layer or multilayer made of any one of molybdenum (Mo), aluminum (Al), chromium (Cr), gold (Au), titanium (Ti), nickel (Ni), neodymium (Nd), and copper (Cu) or an alloy thereof. However, the present disclosure is not limited thereto.

Meanwhile, the oxide thin-film transistor TFT2 includes the second active layer ACT2 formed on the upper buffer layer 115 and implemented by an oxide semiconductor material, the second gate electrode GE2 disposed on the second gate insulation layer 116, and a second source electrode SD3 and a second drain electrode SD4 disposed on the second interlayer insulation layer 117.

The second active layer ACT2 includes a true second channel area, which is implemented by an oxide semiconductor material and is not doped with impurities, and a second source area and a second drain area that become conductors by being doped with impurities.

The oxide thin-film transistor TFT2 further includes the light-blocking layer LS positioned below the upper buffer layer 115 and configured to overlap the second active layer ACT2. The light-blocking layer LS may block light entering the second active layer ACT2, thereby ensuring the reliability of the oxide thin-film transistor TFT2. The light-blocking layer LS may be made of the same material as the first gate electrode GE1 and formed on a top surface of the first gate insulation layer 113. The light-blocking layer LS may be electrically connected to the second gate electrode GE2 and constitute a dual gate.

The second source electrode SD3 and the second drain electrode SD4 may be formed on the second interlayer insulation layer 117 and made of the same material as the first source electrode SD1 and the first drain electrode SD2, thereby reducing the number of mask processes.

Meanwhile, a second electrode CST2 may be disposed on the first interlayer insulation layer 114 and overlap the first electrode CST1, thereby constituting the capacitor CST. For example, the second electrode CST2 may be configured as a single layer or multilayer made of any one of molybdenum (Mo), aluminum (Al), chromium (Cr), gold (Au), titanium (Ti), nickel (Ni), neodymium (Nd), and copper (Cu) or an alloy thereof.

The capacitor CST stores the data voltage, which is applied through the data line DL, for a predetermined period of time and provides the data voltage to the light-emitting element OLED. The capacitor CST includes two electrodes, which corresponds to each other, and a dielectric material between the two electrodes. The first interlayer insulation layer 114 is positioned between the first electrode CST1 and the second electrode CST2.

The first electrode CST1 or the second electrode CST2 of the capacitor CST may be electrically connected to the oxide thin-film transistor TFT2, the second source electrode SD3, or the second drain electrode SD4. However, the present disclosure is not limited thereto. A connection relationship of the capacitor CST may vary depending on the pixel drive circuit.

Meanwhile, a first planarization layer 118 and a second planarization layer 119 are sequentially disposed on the pixel driving circuit to planarize an upper end of the pixel driving circuit. The first planarization layer 118 and the second planarization layer 119 may each be an organic film made of polyimide or acrylic resin.

Further, the light-emitting element OLED is formed on the second planarization layer 119.

The light-emitting element OLED includes an anode electrode ANO, a cathode electrode CAT, and a light-emitting layer EL disposed between the anode electrode ANO and the cathode electrode CAT. In case that the pixel driving circuit is implemented to use in common a low-potential voltage connected to the cathode electrode CAT, the anode electrode ANO is disposed as a separate electrode in each of the subpixels. In case that the pixel driving circuit is implemented to use in common a high-potential voltage, the cathode electrode CAT may be disposed as a separate electrode in each of the subpixels.

The light-emitting element OLED is electrically connected to the driving element through an intermediate electrode CNE disposed on the first planarization layer 118. Specifically, the anode electrode ANO of the light-emitting element OLED and the first source electrode SD1 of the polycrystalline thin-film transistor TFT1, which constitutes the pixel driving circuit, are connected to each other by the intermediate electrode CNE.

The anode electrode ANO is connected to the intermediate electrode CNE exposed through a contact hole formed through the second planarization layer 119. In addition, the intermediate electrode CNE is connected to the first source electrode SD1 exposed through a contact hole formed through the first planarization layer 118.

The intermediate electrode CNE may serve as a medium that connects the first source electrode SD1 and the anode electrode ANO. The intermediate electrode CNE may be made of a conductive material such as copper (Cu), silver (Ag), molybdenum (Mo), or titanium (Ti).

The anode electrode ANO may have a multilayer structure including a transparent conductive film and an opaque conductive film having high reflection efficiency. The transparent conductive film may be made of a material such as indium-tin-oxide (ITO) or indium-zinc-oxide (IZO) having a comparatively large work function value. The opaque conductive film may be configured as a single layer or multilayer including aluminum (Al), silver (Ag), copper (Cu), lead (Pb), molybdenum (Mo), titanium (Ti), or an alloy thereof. For example, the anode electrode ANO may have a structure made by sequentially stacking the transparent conductive film, the opaque conductive film, and the transparent conductive film. Alternatively, the anode electrode ANO may have a structure made by sequentially stacking the transparent conductive film and the opaque conductive film.

The light-emitting layer EL is formed by stacking a positive hole-related layer, an organic light-emitting layer, and an electron-related layer on the anode electrode ANO in this order or the reverse order.

A bank layer BNK may be a pixel definition film that exposes the anode electrode ANO of each of the pixels P. The bank layer BNK may be made of an opaque material (e.g., black) to suppress light interference between the adjacent pixels P. In this case, the bank layer BNK includes a light-blocking material made of at least any one of color pigment, organic black, and carbon. A spacer 700 may be further disposed on the bank layer BNK.

The cathode electrode CAT is formed on a top surface and a side surface of the light-emitting layer EL while opposing the anode electrode ANO with the light-emitting layer EL interposed therebetween. The cathode electrode CAT may be formed integrally in an entire display area AA. In case that the cathode electrode CAT is applied to a top-emission organic light-emitting display device, the cathode electrode CAT may be configured by a transparent conductive film made of indium-tin-oxide (ITO) or indium-zinc-oxide (IZO).

The encapsulation layer 120 for suppressing moisture penetration may be further disposed on the cathode electrode CAT.

The encapsulation layer 120 may inhibit outside moisture or oxygen from penetrating into the light-emitting element OLED vulnerable to outside moisture or oxygen. To this end, the encapsulation layer 120 may have at least one inorganic encapsulation layer and at least one organic encapsulation layer. However, the present disclosure is not limited thereto. In the present disclosure, a structure of the encapsulation layer 120, in which a first encapsulation layer 121, a second encapsulation layer 122, and a third encapsulation layer 123 are sequentially stacked, will be described as an example.

The first encapsulation layer 121 is formed on the substrate 111 on which the cathode electrode CAT is formed. The third encapsulation layer 123 is formed on the substrate 111 on which the second encapsulation layer 122 is formed. The third encapsulation layer 123, together with the first encapsulation layer 121, may be formed to surround a top surface, a bottom surface, and a side surface of the second encapsulation layer 122. The first encapsulation layer 121 and the third encapsulation layer 123 may reduce or suppress the penetration of outside moisture or oxygen into the light-emitting element OLED. The first encapsulation layer 121 and the third encapsulation layer 123 may be made of an inorganic insulating material, such as silicon nitride (SiNx), silicon oxide (SiOx), silicon oxynitride (SiON), or aluminum oxide ($Al_2O_3$) that may be deposited at a low temperature. The first encapsulation layer 121 and the third encapsulation layer 123 are deposited at a low-temperature ambience, such that it is possible to suppress damage to the light-emitting element OLED vulnerable to a high-temperature ambience during a process of depositing the first encapsulation layer 121 and the third encapsulation layer 123.

The second encapsulation layer 122 may planarize step difference between the layers while serving as a buffer that mitigates stress between the layers caused when the display device 10 is bent. The second encapsulation layer 122 may be formed on the substrate 111, on which the first encapsulation layer 121 is formed, and made of a non-photosensitive organic insulating material, such as acrylic resin, epoxy resin, phenolic resin, polyamide resin, polyimide resin, polyethylene, or silicon oxycarbon (SiOC), or a photosensitive organic insulating material such as photo acrylic. However, the present disclosure is not limited thereto. In case that the second encapsulation layer 122 is formed in an inkjet manner, a dam DAM may be disposed to inhibit the second encapsulation layer 122 in a liquid phase from being diffused to an edge of the substrate 111. The dam DAM may be disposed to be closer to the edge of the substrate 111 than the second encapsulation layer 122. The dam DAM may inhibit the second encapsulation layer 122 from being diffused to a pad area in which a conductive pad disposed at an outermost periphery of the substrate 111 is disposed.

The dam DAM is designed to suppress the diffusion of the second encapsulation layer 122. In case that the second encapsulation layer 122 is formed beyond a height of the dam DAM during the process, the second encapsulation layer 122, which is an organic layer, may be exposed to the outside, and moisture or the like may easily penetrate into the light-emitting element. Therefore, at least ten or more dams DAM may be repeatedly formed to suppress the moisture penetration.

The dam DAM may be disposed on the second interlayer insulation layer 117 in a non-display area NDA.

In addition, the dam DAM may be formed simultaneously with the first planarization layer 118 and the second planarization layer 119. A lower layer of the dam DAM may be formed together with the first planarization layer 118 when the first planarization layer 118 is formed. An upper layer of the dam DAM is formed together with the second planarization layer 119 when the second planarization layer 119 is formed. Therefore, the lower and upper layers of the dam DAM may be stacked as a dual structure.

Therefore, the dam DAM may be made of the same material as the first planarization layer 118 and the second planarization layer 119. However, the present disclosure is not limited thereto.

The dam DAM may be formed to overlap a low-potential driving power line VSS. For example, the low-potential driving power line VSS may be formed on a lower layer in an area in which the dam DAM is positioned in the non-display area NDA.

The low-potential driving power line VSS and the gate driver 300, which is configured in a gate-in-panel (GIP) shape, are formed in a shape that surrounds the outer periphery of the display panel. The low-potential driving power line VSS may be positioned to be closer to the outer periphery than the gate driver 300. In addition, the low-potential driving power line VSS may be connected to the cathode electrode CAT and apply a common voltage. The gate driver 300 is simply illustrated in a top plan view and a cross-sectional view. However, the gate driver 300 may be configured by using a thin-film transistor having the same structure as the thin-film transistor of the display area AA.

The low-potential driving power line VSS is disposed outward of the gate driver 300. The low-potential driving power line VSS is disposed outward of the gate driver 300 and surrounds the display area AA. For example, the low-potential driving power line VSS may be made of the same material as the first gate electrode GE1. However, the present disclosure is not limited thereto. The low-potential driving power line VSS may be made of the same material as the second electrode CST2 or the first source and drain electrodes SD1 and SD2. However, the present disclosure is not limited thereto.

In addition, the low-potential driving power line VSS may be electrically connected to the cathode electrode CAT. The low-potential driving power line VSS may supply the low-potential drive voltage EVSS to the plurality of pixels P of the display area AA.

A touch layer may be disposed on the encapsulation layer 120. A touch buffer film 151 on the touch layer may be positioned between the cathode electrode CAT of the light-emitting element OLED and a touch sensor metal including touch electrode connection lines 152 and 154 and touch electrodes 155 and 156.

The touch buffer film 151 may inhibit outside moisture or a liquid chemical (a developer, an etching liquid, or the like), which is used for a process of manufacturing the touch sensor metal disposed on the touch buffer film 151, from being introduced into the light-emitting layer EL including an organic material. Therefore, the touch buffer film 151 may suppress damage to the light-emitting layer EL vulnerable to a liquid chemical or moisture.

To suppress damage to the light-emitting layer EL including an organic material vulnerable to a high temperature, the touch buffer film 151 may be made of an organic insulating material that may be formed at a predetermined low temperature (e.g., 100° C.) or less and have low permittivity of 1 to 3. For example, the touch buffer film 151 may be made of an acrylic-based, epoxy-based, or siloxane-based material. The touch buffer film 151, which is made of an organic insulating material and has planarization performance, may suppress damage to the encapsulation layer 120 and the breakage of the touch sensor metal, which is formed on the touch buffer film 151, caused when the organic light-emitting display device is bent.

According to a mutual-capacitance-based touch sensor structure, the touch electrodes 155 and 156 may be disposed on the touch buffer film 151, and the touch electrodes 155 and 156 may be disposed to intersect one another.

The touch electrode connection lines 152 and 154 may electrically connect the touch electrodes 155 and 156. The touch electrode connection lines 152 and 154 and the touch electrodes 155 and 156 may be positioned on different layers with a touch insulation film 153 interposed therebetween.

The touch electrode connection lines 152 and 154 may be disposed to overlap a bank layer 165 and suppress a deterioration in aperture ratio.

Meanwhile, in the touch electrodes 155 and 156, a part of the touch electrode connection line 152 may pass over an upper portion and a side surface of the encapsulation layer 120 and an upper portion and a side surface of the dam DAM and be electrically connected to a touch drive circuit (not illustrated) through a touch pad PAD.

A part of the touch electrode connection line 152 may be supplied with a touch driving signal from a touch drive circuit and transmit the touch driving signal to the touch electrodes 155 and 156, and a part of the touch electrode connection line 152 may transmit touch sensing signals from the touch electrodes 155 and 156 to the touch drive circuit.

A touch protective film 157 may be disposed on the touch electrodes 155 and 156. In the drawings, the touch protective film 157 is illustrated as being disposed only on the touch electrodes 155 and 156. However, the present disclosure is not limited thereto. The touch protective film 157 may be expanded to a front or rear side of the dam DAM and disposed even on the touch electrode connection line 152.

Further, a color filter (not illustrated) may be further disposed on the encapsulation layer 120. The color filter may be positioned on the touch layer or positioned between the encapsulation layer 120 and the touch layer.

Figure 3:
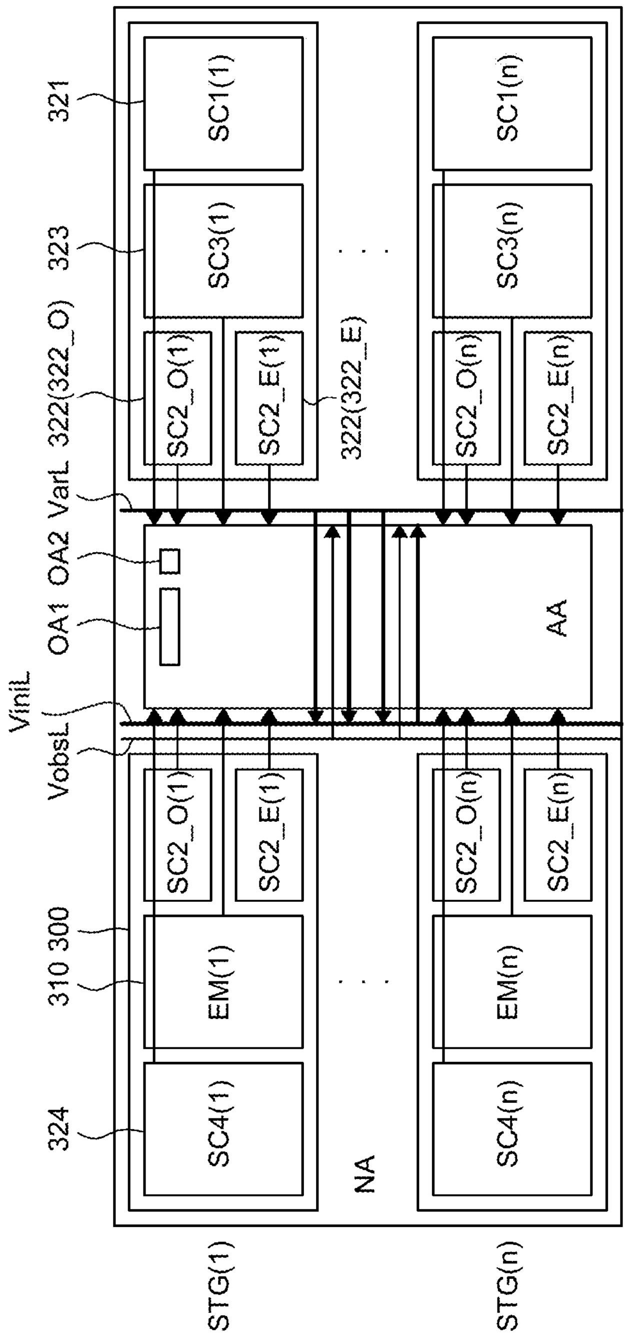
FIG. 3 is a view illustrating a configuration of a gate driver of the display device according to the embodiment of the present disclosure.

FIG. 3 is a view illustrating a configuration of the gate driver of the display device according to the embodiment of the present disclosure.

With reference to FIG. 3, the gate driver 300 includes the light emission control signal driver 310 and the scan driver 320. The scan driver 320 may include first to fourth scan drivers 321, 322, 333, and 334. In addition, the second scan driver 322 may include an odd-numbered second scan driver 322_O and an even-numbered second scan driver 322_E.

In the gate driver 300, the shift registers may be configured symmetrically at two opposite sides of the display area AA. In addition, the gate driver 300 may be configured such that the shift register at one side of the display area AA includes the second scan drivers 322_O and 322_E, the fourth scan driver 324, and the light emission control signal driver 310, and the shift register at the other side of the display area AA includes the first scan driver 321, the second scan drivers 322_O and 322_E, and the third scan driver 323. However, the present disclosure is not limited thereto. The light emission control signal driver 310 and the first to fourth scan drivers 321, 322, 323, and 324 may be differently disposed according to the embodiment.

Stages STG1 to STGn of the shift register may include first scan signal generators SC1(1) to SC1($n$), second scan signal generators SC2_O(1) to SC2_O(n) and SC2_E(1) to SC2_E(n), third scan signal generators SC3(1) to SC3($n$), fourth scan signal generators SC4(1) to SC4($n$), and light emission control signal generators EM(1) to EM(n).

The first scan signal generators SC1(1) to SC1($n$) output first scan signals SC1(1) to SC1($n$) through first gate lines SCL1 of the display panel 100. The second scan signal generators SC2(1) to SC2($n$) output second scan signals SC2(1) to SC2($n$) through second gate lines SCL2 of the display panel 100. The third scan signal generators SC3(1) to SC3($n$) output third scan signals SC3(1) to SC3($n$) through third gate lines SCL3 of the display panel 100. The fourth scan signal generators SC4(1) to SC4($n$) output fourth scan signals SC4(1) to SC4($n$) through fourth gate lines SCL4 of the display panel 100. The light emission control signal generators EM(1) to EM(n) output light emission control signals EM(1) to EM(n) through the light emission control lines EML of the display panel 100.

The first scan signals SC1(1) to SC1($n$) may be used as signals for operating an A-th transistor (e.g., a compensation transistor or the like) included in the pixel circuit. The second scan signals SC2(1) to SC2($n$) may be used as signals for operating a B-th transistor (e.g., a data supply transistor or the like) included in the pixel circuit. The third scan signals SC3(1) to SC3($n$) may be used as signals for operating a C-th transistor (e.g., a bias transistor or the like) included in the pixel circuit. The fourth scan signals SC4(1) to SC4($n$) may be used as signals for operating a D-transistor (e.g., an initialization transistor or the like) included in the pixel circuit. The light emission control signals EM(1) to EM(n) may be used as signals for operating an E-th transistor (e.g., a light emission control transistor or the like) included in the pixel circuit. For example, the light emission time of the light-emitting element is changed when the light emission control transistors of the pixels are controlled by using the light emission control signals EM(1) to EM(n).

With reference to FIG. 3, a bias voltage bus line VobsL, a first initialization voltage bus line VarL, and a second initialization voltage bus line ViniL may be disposed between the gate driver 300 and the display area AA.

The bias voltage bus line VobsL, the first initialization voltage bus line VarL, and the second initialization voltage bus line ViniL may supply the bias voltage Vobs, a first initialization voltage Var, and a second initialization voltage Vini from the power source 500 to the pixel circuit.

In the drawings, the bias voltage bus line VobsL, the first initialization voltage bus line VarL, and the second initialization voltage bus line ViniL are illustrated as being positioned only at one of the left and right sides of the display area AA. However, the present disclosure is not limited thereto. The bias voltage bus line VobsL, the first initialization voltage bus line VarL, and the second initialization voltage bus line ViniL may be positioned at two opposite sides or positioned at one side without being limited in position to the left or right side.

With reference to FIG. 3, at least one optical areas OA1 and OA2 may be disposed in the display area AA.

At least one optical areas OA1 and OA2 may be disposed to overlap at least one optical electronic devices such as an image capturing device, such as a camera (image sensor), and a detection sensor such as a proximity sensor and an illuminance sensor.

At least one optical areas OA1 and OA2 may have a light transmissive structure and have a transmittance rate at a predetermined level or higher in order to operate an electronic optical device. In other words, in at least one optical areas OA1 and OA2, the number of pixels P per unit area may be smaller than the number of pixels P per unit area in a general area in the display area AA, except for the optical areas OA1 and OA2. That is, the resolution in at least one optical areas OA1 and OA2 may be lower than the resolution in the general area in the display area AA.

In at least one optical areas OA1 and OA2, the light transmissive structure may be configured by patterning a cathode electrode on a portion where the pixel P is not disposed. In this case, the patterned cathode electrode may be removed by using a laser. Alternatively, the cathode electrode may also be selectively formed and patterned by using a material such as a cathode deposition suppressing layer.

In addition, in at least one optical areas OA1 and OA2, the light transmissive structure may be configured by forming and separating the light-emitting element OLED and the pixel circuit in the pixel P. In other words, the light-emitting element OLED of the pixel P may be positioned in the optical areas OA1 and OA2, and a plurality of transistors TFT, which constitutes the pixel circuit, is disposed around the optical areas OA1 and OA2, such that the light-emitting element OLED and the pixel circuit may be electrically connected through the transparent metal layer.

Figure 4:
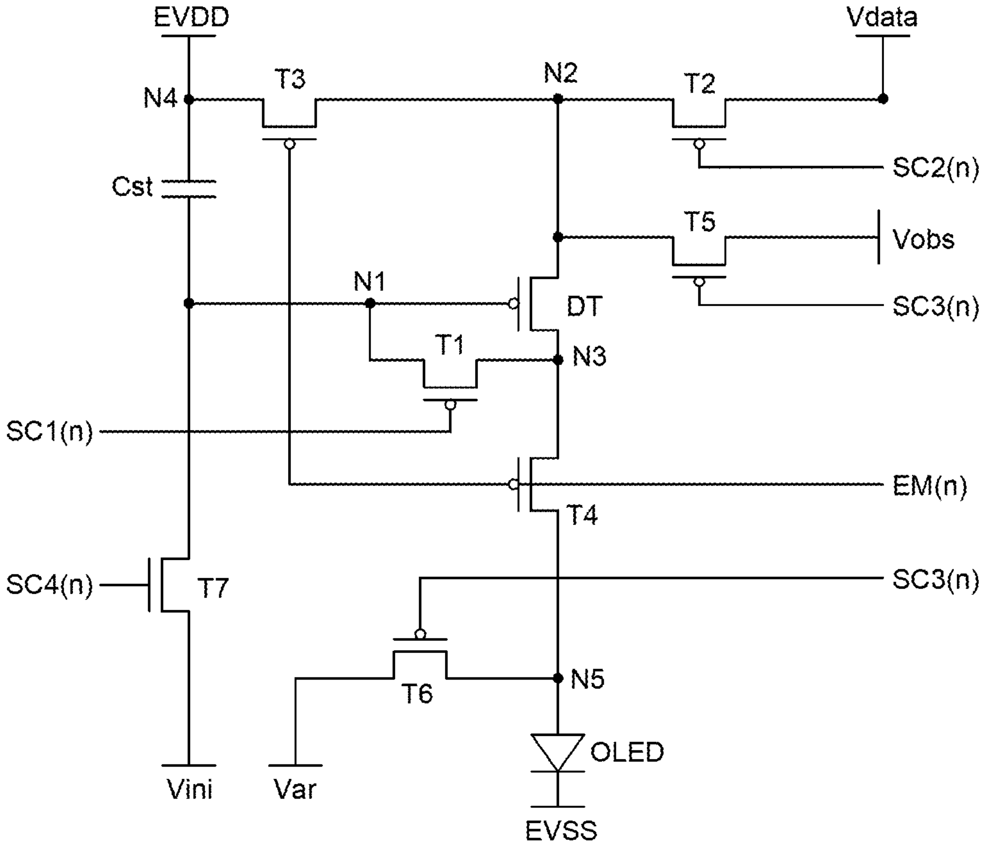
FIG. 4 is a view illustrating a pixel circuit of the display device according to the embodiment of the present disclosure.

FIG. 4 is a view illustrating the pixel circuit of the display device according to the embodiment of the present disclosure.

FIG. 4 exemplarily illustrates the pixel circuit for illustrative purposes only. The pixel circuit is not limited as long as the pixel circuit has a structure capable of controlling light emission of the light-emitting element OLED by applying the EM signal EM(n). For example, the pixel circuit may include an additional scan signal, a switching thin-film transistor connected to the additional scan signal. An additional initialization voltage may be applied to the switching thin-film transistor. Connection relationships between switching elements and connection positions of capacitors may be variously set. Hereinafter, for convenience of description, the display device having a pixel circuit structure in FIG. 4 will be described.

With reference to FIG. 4, the plurality of pixels P may each include the pixel circuit having a driving transistor DT, and the light-emitting element OLED connected to the pixel circuit.

The pixel circuit may operate the light-emitting element OLED by controlling a drive current flowing in the light-emitting element OLED. The pixel circuit may include the driving transistor DT, first to seventh transistors T1, T2, T3, T4, T5, T6, and T7, and a capacitor Cst. The transistors DT, T1, T2, T3, T4, T5, T6, and T7 may each include a first electrode, a second electrode, and a gate electrode. One of the first and second electrodes may be a source electrode, and the other of the first and second electrodes may be a drain electrode.

The transistors DT, T1, T2, T3, T4, T5, T6, and T7 may each be a P-type thin-film transistor or an N-type thin-film transistor. In the embodiment in FIG. 3, the first transistor T1 and the seventh transistor T7 are each configured as an N-type thin-film transistor, and the remaining transistors DT, T2, T3, T4, T5, and T6 are each configured as a P-type thin-film transistor. However, the present disclosure is not limited thereto. According to the embodiment, all or some of the transistors DT, T1, T2, T3, T4, T5, T6, and T7 may be the P-type thin-film transistors or the N-type thin-film transistors. In addition, the N-type thin-film transistor may be an oxide thin-film transistor, and the P-type thin-film transistor may be a polycrystalline silicon thin-film transistor.

Hereinafter, an example will be described in which the first transistor T1 and the seventh transistor T7 are each an N-type thin-film transistor, and the remaining transistors DT, T2, T3, T4, T5, and T6 are each a P-type thin-film transistor. Therefore, the first transistor T1 and the seventh transistor T7 are turned on by receiving high voltages, and the remaining transistors DT, T2, T3, T4, T5, and T6 are turned on by receiving low voltages.

For example, the first transistor T1, which constitutes the pixel circuit, may serve as a compensation transistor, the second transistor T2 may serve as a data supply transistor, the third and fourth transistors T3 and T4 may serve as light-emitting control transistors, the fifth transistor T5 may serve as a bias transistor, and the sixth and seventh transistors T6 and T7 may serve as initialization transistors.

The light-emitting element OLED may include an anode electrode and a cathode electrode. The anode electrode of the light-emitting element OLED may be connected to a fifth node N5, and the cathode electrode may be connected to the low-potential drive voltage EVSS.

The driving transistor DT may include the first electrode connected to a second node N2, the second electrode connected to a third node N3, and the gate electrode connected to a first node N1. The driving transistor DT may provide a drive current Id to the light-emitting element OLED on the basis of a voltage of the first node N1 (or a data voltage stored in the capacitor Cst to be described below).

The first transistor T1 may include the first electrode connected to the first node N1, the second electrode connected to the third node N3, and the gate electrode configured to receive a first scan signal SC1(*n*). The first transistor T1 may be turned on in response to the first scan signal SC1(*n*) and connected between the first node N1 (the data voltage Vdata) and the third node N3 by means of a diode, such that the first transistor T1 may sample a threshold voltage Vth of the driving transistor DT. The first transistor T1 may be a compensation transistor.

The capacitor Cst may be connected or formed between the first node N1 and a fourth node N4. The capacitor Cst may store or maintain the provided high-potential drive voltage EVDD.

The second transistor T2 may include the first electrode connected to the data line DL (or configured to receive the data voltage Vdata), the second electrode connected to the second node N2, and the gate electrode configured to receive the second scan signal SC2(*n*). The second transistor T2 may be turned on in response to the second scan signal SC2(*n*) and transmit the data voltage Vdata to the second node N2. The second transistor T2 may be a data supply transistor.

The third and fourth transistors T3 and T4 (or the first and second light-emitting control transistors) may be connected between the high-potential drive voltage EVDD and the light-emitting element OLED and form a current flow path through which the drive current Id, which is generated by the driving transistor DT, flows.

The third transistor T3 may include the first electrode connected to the fourth node N4 and configured to receive the high-potential drive voltage EVDD, the second electrode connected to the second node N2, and the gate electrode configured to receive the light-emitting control signal EM(n).

The fourth transistor T4 may include the first electrode connected to the third node N3, the second electrode connected to the fifth node N5 (or the anode electrode of the light-emitting element OLED), and the gate electrode configured to receive the light-emitting control signal EM(n).

The third and fourth transistors T3 and T4 may be turned on in response to the light-emitting control signal EM(n). In this case, the drive current Id is provided to the light-emitting element OLED, and the light-emitting element OLED may emit light with brightness corresponding to the drive current Id.

The fifth transistor T5 may include the first electrode configured to receive a bias voltage Vobs, the second electrode connected to the second node N2, and the gate electrode configured to receive the third scan signal SC3(*n*). The fifth transistor T5 may be a bias transistor.

The sixth transistor T6 may include the first electrode configured to receive the first initialization voltage Var, the second electrode connected to the fifth node N5, and the gate electrode configured to receive the third scan signal SC3(*n*).

Before the light-emitting element OLED emits light (or after the light-emitting element OLED emits light), the sixth transistor T6 may be turned on in response to the third scan signal SC3(*n*) and initialize the anode electrode (or pixel electrode) of the light-emitting element OLED by using the first initialization voltage Var. The light-emitting element OLED may have a parasitic capacitor formed between the anode electrode and the cathode electrode. Further, the parasitic capacitor is charged while the light-emitting element OLED emits light, such that the anode electrode of the light-emitting element OLED may have a particular voltage. Therefore, it is possible to initialize a charge quantity accumulated in the light-emitting element OLED by applying the first initialization voltage Var to the anode electrode of the light-emitting element OLED through the sixth transistor T6.

In the present disclosure, the gate electrodes of the fifth and sixth transistor T5 and T6 are configured to receive the third scan signal SC3(*n*) in common. However, the present disclosure is not necessarily limited thereto. The gate electrodes of the fifth and sixth transistor T5 and T6 may be configured to be independently controlled by receiving separate scan signals.

The seventh transistor T7 may include the first electrode configured to receive the second initialization voltage Vini, the second electrode connected to the first node N1, and the gate electrode configured to receive the fourth scan signal SC4(*n*).

The seventh transistor T7 may be turned on in response to the fourth scan signal SC4(*n*) and initialize the gate electrode of the driving transistor DT by using the second initialization voltage Vini. Unnecessary electric charges may remain on the gate electrode of the driving transistor DT because of the high-potential drive voltage EVDD stored in the capacitor Cst. Therefore, it is possible to initialize the residual charge quantity by applying the second initialization voltage Vini to the gate electrode of the driving transistor DT through the seventh transistor T7.

Figure 5A:
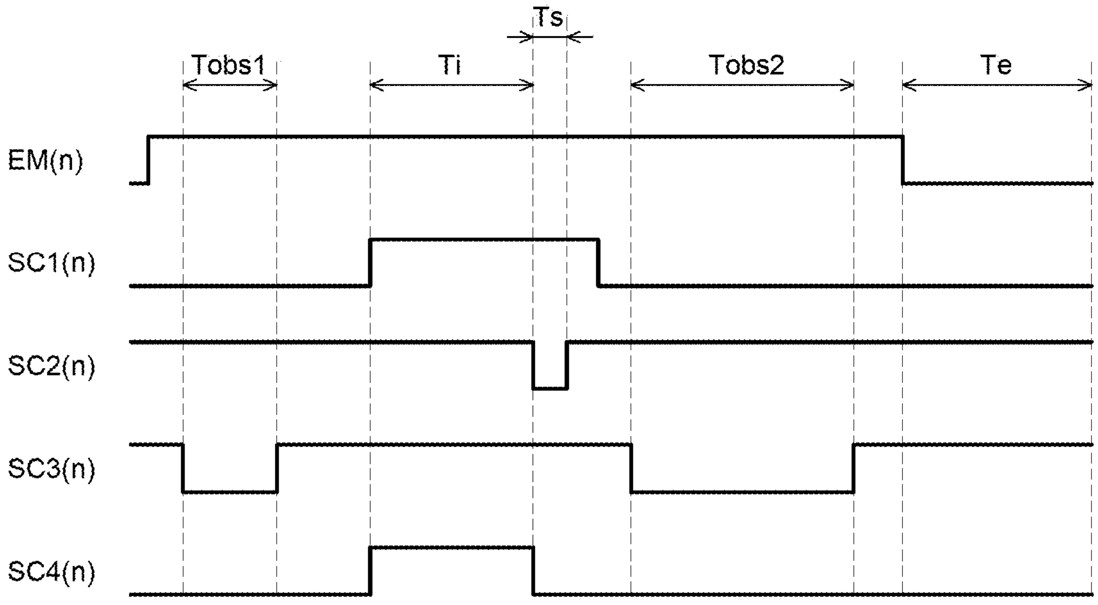
FIGS. 5A and 5B are views for explaining operations of a scan signal and a light emission control signal for a refresh period and a hold period in the pixel circuit illustrated in FIG. 4.
Figure 5B:
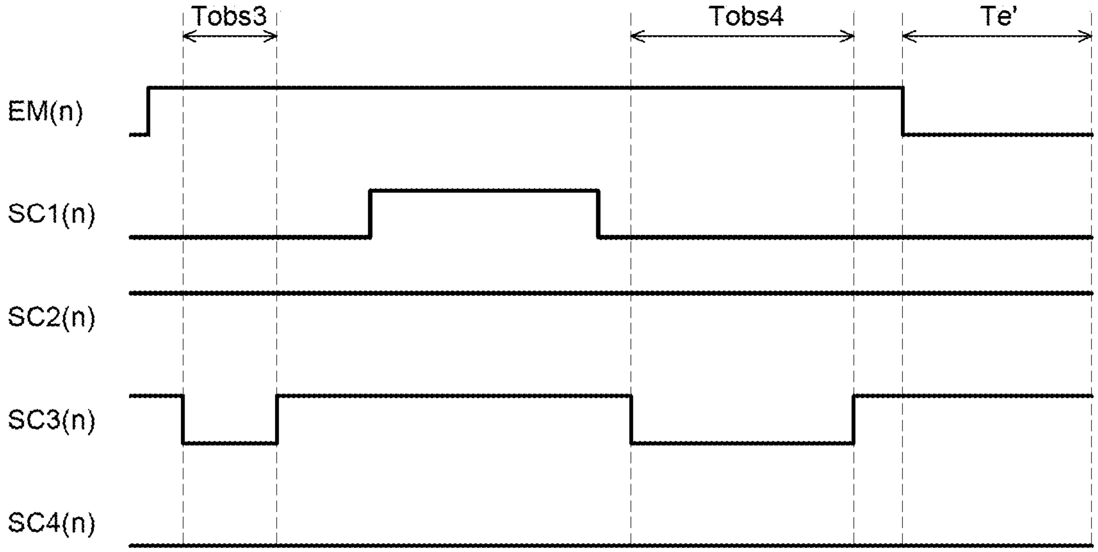

FIGS. 5A and 5B are views for explaining operations of a scan signal and a light emission control signal for a refresh period and a hold period in the pixel circuit illustrated in FIG. 4.

The display device according to the embodiment of the present disclosure may operate as a variable refresh rate (VRR) mode display device. The VRR mode operates at a predetermined frequency. At a time point at which a high-speed operation is required, the VRR mode may operate the pixel by increasing a refresh rate at which the data voltage Vdata is updated or reduce power consumption. At a time point at which a low-speed operation is required, the VRR mode may operate the pixel by decreasing the refresh rate.

The plurality of pixels P may each operate by means of a combination of a refresh frame and a hold frame within 1 second. In the present disclosure, one set is referred to as a configuration in which a combination of the refresh period for which the data voltage Vdata is updated and the hold period for which the data voltage Vdata is not updated is repeated for 1 second. Further, one set period is a cycle in which the combination of the refresh period and the hold period is repeated.

In case that the operation is performed at a refresh rate of 120 Hz, the operation may be performed only for the refresh period. That is, the refresh period may operate 120 times within 1 second. One refresh period is 1/120=8.33 ms, and one set period is also 8.33 ms.

In case that the operation is performed at a refresh rate of 60 Hz, the refresh period and the hold period may operate alternately. The refresh period and the hold period may each operate alternately 60 times within 1 second. One refresh period and one hold period are each 0.5/60=8.33 ms, and one set period is 16.66 ms.

In case that the operation is performed at a refresh rate of 1 Hz, one frame may operate for one refresh period and 119 hold periods after one refresh period. In addition, in case that the operation is performed at a refresh rate of 1 Hz, one frame may operate for a plurality of refresh periods and a plurality of hold periods. In this case, one refresh period and one hold period are each 1/120=8.33 ms, and one set period is 1 s.

For the refresh period, new data voltage Vdata is charged, and the new data voltage Vdata is applied to the driving transistor DT. In contrast, for the hold period, the data voltage Vdata of the previous frame is maintained and used in an intact manner. Meanwhile, the hold period is also called a skip period in the meaning that a process of applying the new data voltage Vdata to the driving transistor DT is excluded.

The plurality of pixels P may each initialize a voltage charged or remaining in the pixel circuit for the refresh period. Specifically, the plurality of pixels P may remove the influence of the data voltage Vdata and the high-potential drive voltage EVDD stored in the previous frame for the refresh period. Therefore, the plurality of pixels P may each display an image corresponding to the new data voltage Vdata for the hold period.

For the hold period, the plurality of pixels P may each display an image by providing the light-emitting element OLED with a drive current corresponding to the data voltage Vdata and maintain a turn-on state of the light-emitting element OLED.

First, the operations of the pixel circuit and the light-emitting element for the refresh period in FIG. 5A will be described. The refresh period may operate and include at least one bias section Tobs1 and Tobs2, an initialization section Ti, a sampling section Ts, and a light-emitting section Te. However, this is just an embodiment, and the present disclosure is not necessarily limited to this order.

With reference to FIG. 5A, the pixel circuit may operate and include at least one bias section Tobs1 and Tobs2 for the refresh period.

At least one bias section Tobs1 and Tobs2 is a section in which an on-bias stress operation OBS of applying the bias voltage Vobs is performed. The light emission control signal EM(n) is a high voltage, and the third and fourth transistors T3 and T4 are turned off. The first scan signal SC1(*n*) and the fourth scan signal SC4(*n*) are low voltages, and the first transistor T1 and the seventh transistor T7 are turned off. The second scan signal SC2 is a high voltage, and the second transistor T2 is turned off.

The third scan signal SC3(*n*) is inputted as a low voltage, and the fifth and sixth transistors T5 and T6 are turned on. As the fifth transistor T5 is turned on, the bias voltage Vobs is applied to the first electrode of the driving transistor DT connected to the second node N2.

In this case, the bias voltage Vobs is supplied to the third node N3 that is the drain electrode of the driving transistor DT, such that a voltage charging time of the fifth node N5, which is the anode electrode of the light-emitting element OLED, may be reduced for a light emission period, or a charging delay of the gate driver may be reduced. The driving transistor DT is maintained in a higher saturated state.

For example, as the bias voltage Vobs increases, a voltage of the third node N3, which is the drain electrode of the driving transistor DT, may increase, and a gate-source voltage or a drain-source voltage of the driving transistor DT may decrease. Therefore, the bias voltage Vobs may be at least higher than the data voltage Vdata.

In this case, the magnitude of the drain source current Id flowing through the driving transistor DT may decrease, and a charging delay of the voltage of the third node N3 may be eliminated by reducing stress of the driving transistor DT in a positive bias stress situation. In other words, before the threshold voltage Vth of the driving transistor DT is sampled, the on-bias stress operation OBS may be performed to mitigate the hysteresis of the driving transistor DT.

Therefore, in at least one bias section Tobs1 and Tobs2, the on-bias stress operation OBS may be referred to as an operation of applying a suitable bias voltage directly to the driving transistor DT for non-light emission periods.

In addition, as the sixth transistor T6 is turned on in at least one bias section Tobs1 and Tobs2, the anode electrode (or the pixel electrode) of the light-emitting element OLED connected to the fifth node N5 may be initialized to the first initialization voltage Var.

However, the gate electrodes of the fifth and sixth transistor T5 and T6 may be configured to be independently controlled by receiving separate scan signals. That is, it is not necessary to simultaneously apply the bias voltage to the first electrode of the driving transistor DT and the anode electrode of the light-emitting element OLED in the bias section.

With reference to FIG. 5A, the pixel circuit may operate and include an initialization section Ti for the refresh period. The initialization section Ti is a section for initializing the voltage of the gate electrode of the driving transistor DT.

The first to fourth scan signals SC1(*n*), SC2(*n*), SC3(*n*), and SC4(*n*) and the light emission control signal EM(n) are high voltages, and the first transistor T1 and the seventh transistor T7 are turned on. The second to sixth transistors T2, T3, T4, T5, and T6 are turned off. As the first and seventh transistors T1 and T7 are turned on, the gate electrode and the second electrode of the driving transistor DT connected to the first node N1 are initialized to the second initialization voltage Vini.

With reference to FIG. 5A, the pixel circuit may operate and include a sampling section Ts for the refresh period. The sampling section is a section for sampling the threshold voltage Vth of the driving transistor DT.

The first scan signal SC1(*n*), the third scan signal SC3(*n*), and the light emission control signal EM(n) are high voltages, and the second scan signal SC2(*n*) and the fourth scan signal SC4(*n*) are inputted as low voltages. Therefore, the third to seventh transistors T3, T4, T5, T6, and T7 are turned off, the first transistor T1 is maintained in the on state, and the second transistor T2 is turned on. That is, the second transistor T2 is turned on, such that a data voltage Vatat is applied to the driving transistor DT. The first transistor T1 may be connected between the first node N1 and the third node N3 by means of a diode, such that the threshold voltage Vth of the driving transistor DT may be sampled.

With reference to FIG. 5A, the pixel circuit may operate and include a light emission section Te for the refresh period. The light emission section Te is a section that offsets the sampled threshold voltage Vth and allows the light-emitting element OLED to emit light with a drive current corresponding to the sampled data voltage.

The light emission control signal EM(n) is a low voltage, and the third and fourth transistors T3 and T4 are turned on.

As the third transistor T3 is turned on, the high-potential drive voltage EVDD connected to the fourth node N4 is applied to the first electrode of the driving transistor DT connected to the second node N2 through the third transistor T3. The drive current Id, which is supplied to the light-emitting element OLED via the fourth transistor T4 from the driving transistor DT, is not related to a value of the threshold voltage Vth of the driving transistor DT, such that the threshold voltage Vth of the driving transistor DT is compensated and operated.

Next, the operations of the pixel circuit and the light-emitting element for the hold period will be described with reference to FIG. 5B.

The hold period may include at least one bias section Tobs3 and Tobs4 and a light emission section Te'. The description of the operation of the pixel circuit identical to the operation of the refresh period will be omitted.

As described above, there is a difference in that the new data voltage Vdata is charged and the new data voltage Vdata is applied to the gate electrode of the driving transistor DT for the refresh period, whereas the data voltage Vdata of the refresh period is maintained and used in an intact manner for the hold period. Therefore, unlike the refresh period, the hold period does not require the initialization section Ti and the sampling section Ts.

Only one on-bias stress operation OBS may be sufficient during the operation for the hold period. However, in the present embodiment, for convenience of the drive circuit, the third scan signal SC3(*n*) of the hold period operates in the same way as the third scan signal SC3(*n*) of the refresh period. Therefore, the on-bias stress operation OBS may operate twice, as in the refresh period.

The operation for the refresh period described with reference to FIG. 5A differs from the driving signal for the hold period in FIG. 5B in terms of the second and fourth scan signals SC2(*n*) and SC4(*n*). Because the initialization section Ti and the sampling section Ts are not required for the hold period, the second scan signal SC2(*n*) is always a high voltage, and the fourth scan signal SC4(*n*) is always a low voltage, unlike the refresh period. That is, the second and seventh transistors T2 and T7 are always turned off.

Figure 6:
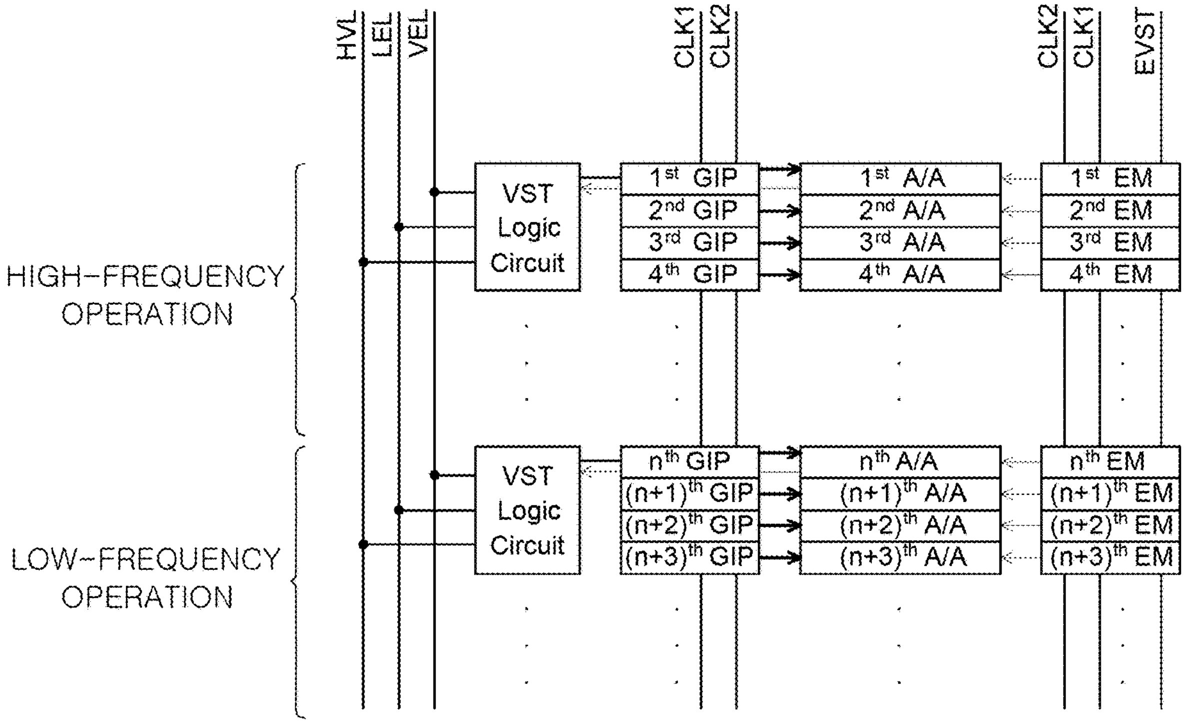
FIG. 6 is a view illustrating a structure in which a gate incoming circuit is connected to a gate driver of the display device according to the embodiment of the present disclosure.

FIG. 6 is a view illustrating the gate driver including a gate incoming circuit according to the embodiment of the present disclosure.

According to the embodiment, the gate driver may include a plurality of gate-in-panel circuits (GIP circuits). The GIP circuits may be formed at one side edge or two opposite side edges of the display panel. The GIP circuit includes a plurality of stages into which the start pulse and the shift clock are inputted. The stages generate outputs in response to the start pulse and shift the outputs on the basis of the shift clock. The plurality of stages is included in the shift register.

The stages of the shift register include a Q node for charging a gate pulse, a QB node for discharging the gate pulse, and a switch circuit connected to the Q node and the QB node. The switch circuit increases a voltage of the gate pulse by charging the Q node in response to the start pulse or the output of the previous stage and discharges the QB node in response to an output or reset signal of the next stage. The switch circuit includes TFTs of a metal oxide semiconductor field effect transistor (MOSFET) structure.

The shift register includes a plurality of dependently connected stages. The stages respectively output first to n-th scan pulses (n is a natural number of two or more). The scan pulse also serves as carry signals applied to the gate lines of the display device and simultaneously transmitted to a front end stage and a rear end stage. In the following description, the front end stage is positioned on an upper portion of the stage that is a reference stage, and the rear end stage is positioned on a lower portion of the stage that is the reference stage.

With reference to FIG. 6, the shift register sequentially outputs the scan pulse. The shift clock, which is sequentially delayed, is inputted to the first to n-th stages, and the scan pulse is sequentially outputted on the basis of the shift clock.

The stages of the shift register begin to output the scan pulse in response to the start pulse and shifts the scan pulse in response to the shift clock. The scan pulse outputted from each of the stages is supplied to the gate line and simultaneously inputted to the next stage as a pre-carry signal. The pre-carry signal is used to pre-charging the Q node to generate the output from each of the stages. In this case, the pre-carry signal is not inputted to a foremost end stage of a group of stages, and the start pulse is inputted to the foremost end stage. In addition, each of the stages receives a post carry signal for discharging the Q node after an output signal is generated. However, the post carry signal is not inputted to the n-th stage that is a rearmost end stage.

According to the embodiment of the present disclosure, the plurality of GIP circuits may each include a plurality of stages including the foremost end stage and the rearmost end stage. For example, the first GIP circuit may include the plurality of stages (e.g., first to q-th stages (q is a natural number of two or more)), and the second GIP circuit may include another plurality of stages (e.g., (q+1)th to r-th stages (r is a natural number of (q+1) or more). For reference, in the following description, the front end GIP circuit is positioned on an upper portion of the GIP circuit that is a reference GIP circuit, and the rear end GIP circuit is positioned on a lower portion of the GIP circuit that is the reference GIP circuit. The foremost end GIP circuit is positioned at an uppermost end of the gate driver, and the rearmost end GIP circuit is positioned at a lowermost end of the gate driver.

According to the embodiment of the present disclosure, the foremost end stage of the GIP circuit may receive the start pulse or the pre-carry signal, and the pre-carry signal may be provided from the rearmost end stage of the front end GIP circuit. At least some of the plurality of GIP circuits receive the start pulse, and some of the remaining GIP circuits receive the pre-carry signal from the rearmost end stage of the front end GIP circuit.

According to the embodiment of the present disclosure, the GIP circuit(s), which may receive the start pulse, is electrically connected to the gate incoming circuit. In contrast, the GIP circuit(s), which may receive the pre-carry signal, may be electrically connected to the adjacent GIP circuit without being electrically connected to the gate incoming circuit.

The GIP circuit(s), which may receive the start pulse, may adjust a frequency for outputting the scan pulse on the basis of the start pulse provided from the gate incoming circuit. As described above, as the frequency is adjusted, the display area, which corresponds to the GIP circuit(s) made before the frequency is adjusted by the gate incoming circuit, may operate at a first driving frequency, and the display area, which corresponds to the GIP circuit(s) made after the frequency is adjusted, may operate at a second driving frequency. In this application, a partial area of the display area may operate at a low frequency, and another area may operate at a high frequency. In addition, in this application, an area of the display area, which is to operate at a particular frequency (e.g., a high-frequency, a low frequency, or an intermediate frequency), may be specified by controlling the gate incoming circuit.

According to the embodiment of the present disclosure, the gate incoming circuit may receive a high-frequency (HF) start pulse. In the present specification, the HF start pulse may be referred to as a (first) start pulse corresponding to the high-frequency operation. The gate incoming circuit may provide the HF start pulse to the GIP circuit(s) on the basis of a variable frequency enable (VF enable) signal and an EM signal EM out. The GIP circuit, which receives the HF start pulse, supports the high-frequency operation. The principle of supplying the HF start pulse in response to the VF enable signal and the EM signal will be described below with reference to FIGS. 7 to 9D.

According to the embodiment of the present disclosure, the gate incoming circuit may receive a low-frequency (LF) start pulse. In the present specification, the LF start pulse may be referred to as a (second) start pulse corresponding to a low-frequency operation. The gate incoming circuit may provide the LF start pulse, which corresponds to VGH, to the GIP circuit(s) on the basis of a low-frequency enable (LF enable) signal. In the present specification, for convenience of description, the term "start pulse" may be referred to as "VST."

The gate driver according to the embodiment of the present disclosure includes at least one of gate incoming circuits configured to selectively output any one of the plurality of dependently connected stages, a first start pulse HF VST corresponding to the high-frequency operation, and a second start pulse LF VST corresponding to the low-frequency operation. At least one of the plurality of stages may be connected to the gate incoming circuit and receive any one of the first start pulse HF VST and the second start pulse LF VST outputted by the gate incoming circuit. At least one of gate incoming circuits may be dependently connected to the output of the stage positioned at the front end based on the stage to which at least one of gate incoming circuits are connected.

According to the embodiment of the present disclosure, the gate incoming circuit may be electrically connected to an HF VST line HVL that provides HF VST. The gate incoming circuit may supply the HF VST, which is provided from the HF VST line HVL, to the stage(s) on the basis of the VF enable signal and the EM signal.

According to the embodiment of the present disclosure, the gate incoming circuit may be disposed in the same cycle as OFF of the EM signal. For example, in case that OFF of the EM signal is 4HT (horizontal time), the gate incoming circuit may be disposed for four GIP lines. For example, in case that OFF of the EM signal is 4HT (horizontal time), the gate incoming circuits may be disposed for four stages.

Hereinafter, the gate incoming circuit according to the embodiment of the present disclosure will be described. The gate incoming circuit is configured to output VST to the GIP circuit. The GIP circuit receives the VST and controls the corresponding display area at a driving frequency corresponding to the VST.

Figure 7:
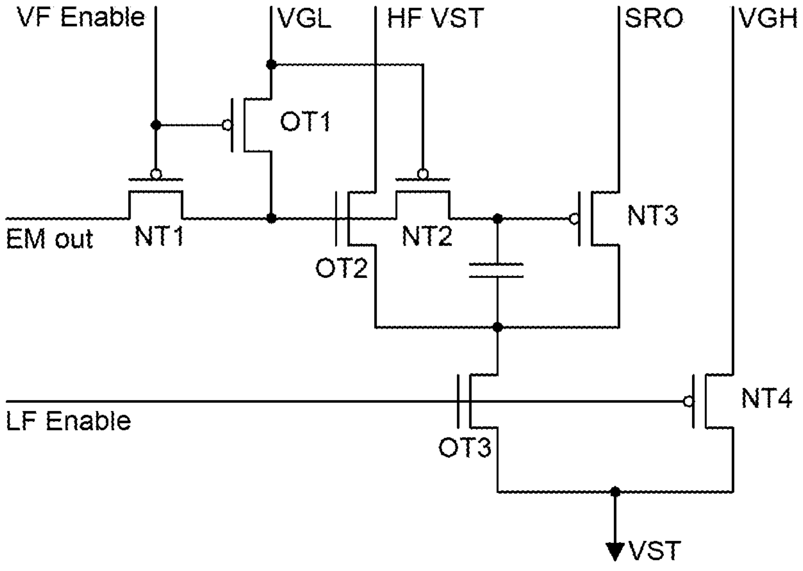
FIG. 7 is a view illustrating the gate incoming circuit of the display device according to the embodiment of the present disclosure.
Figure 8A:
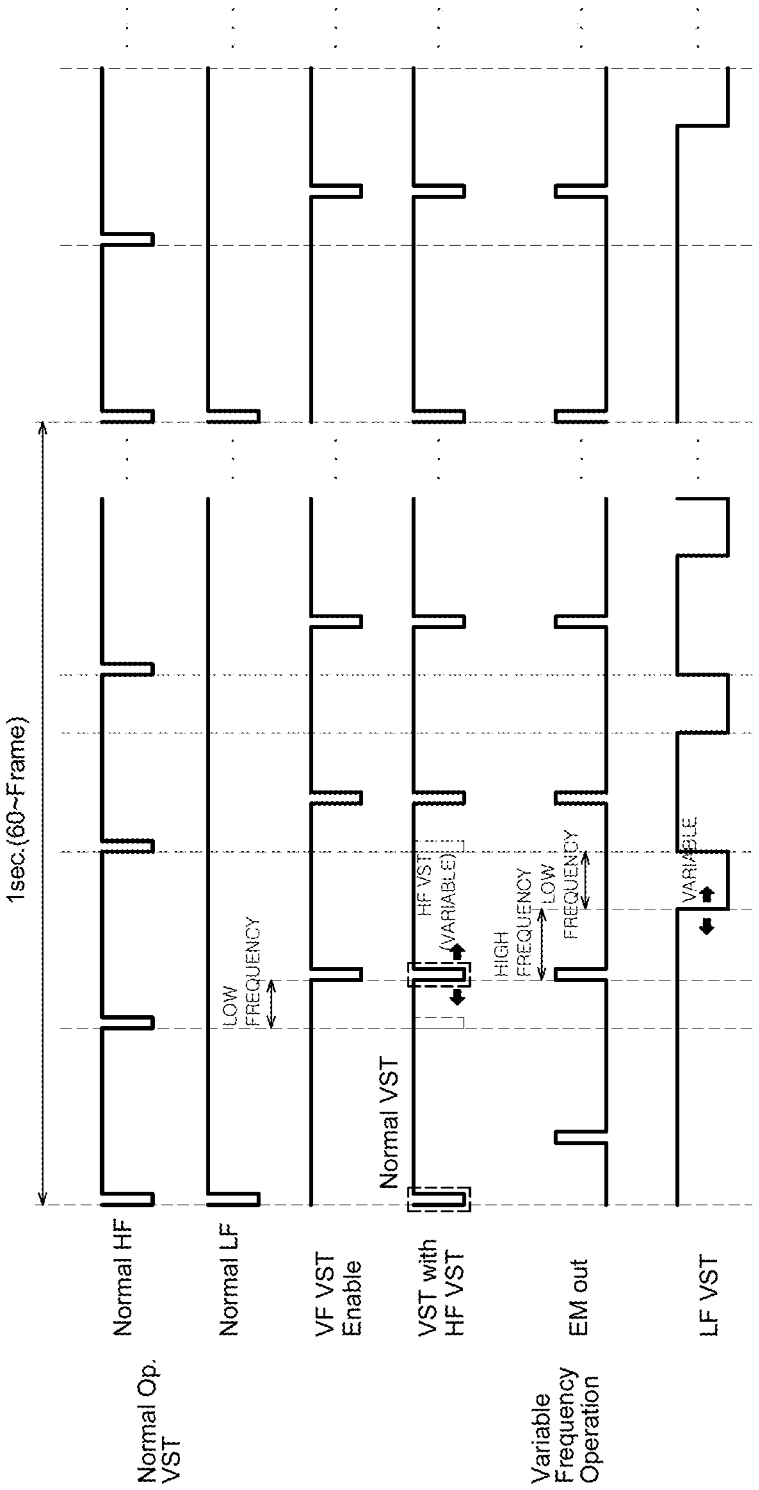
FIGS. 8A to 8C are waveform diagrams illustrating frequency division driving of the display device according to the embodiment of the present disclosure.
Figure 8B:
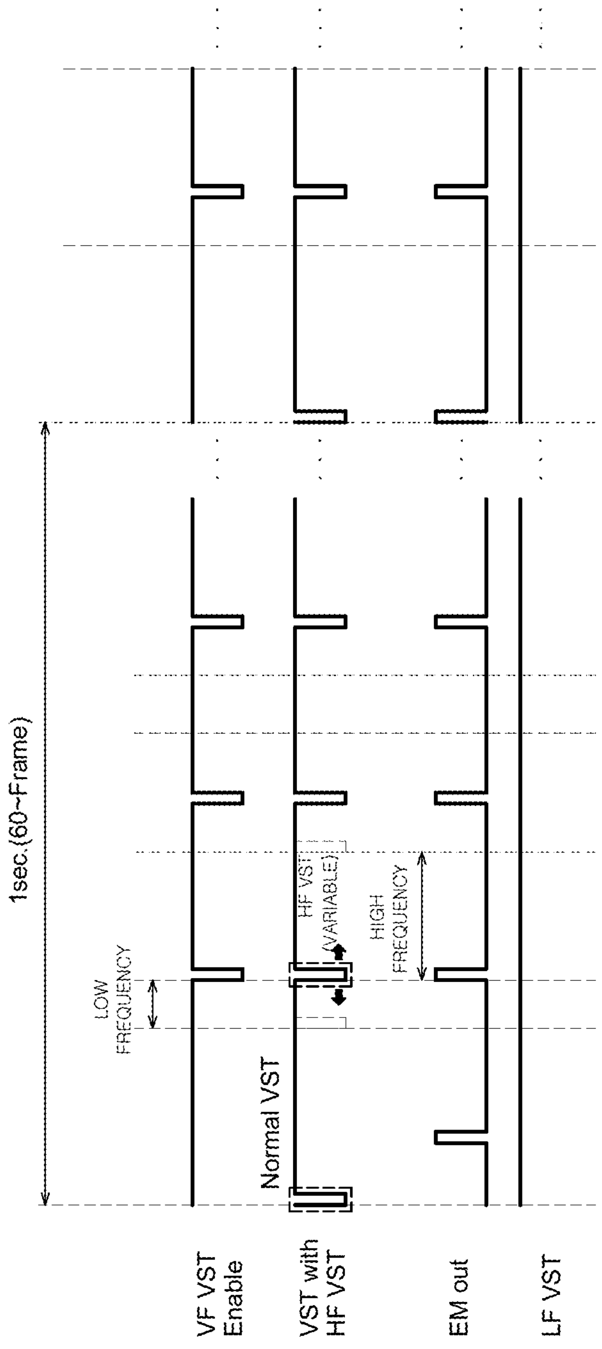
Figure 8C:
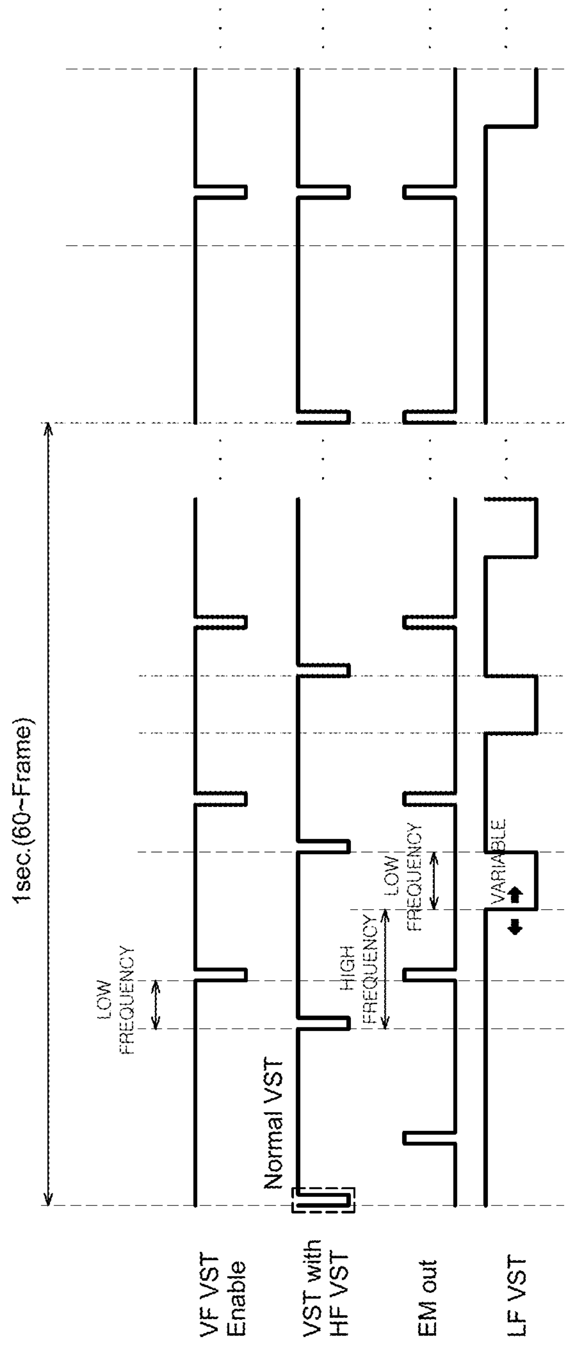

FIG. 7 is a view illustrating the gate incoming circuit of the display device according to the embodiment of the present disclosure. FIGS. 8A to 8C are waveform diagrams illustrating frequency division driving of the display device according to the embodiment of the present disclosure. FIGS. 9A to 9D are views for explaining an operational sequence of the gate incoming circuit according to the embodiment of the present disclosure.

The gate incoming circuit includes a plurality of transistors and capacitors. The transistor is a three-electrode element including a gate, a source, and a drain. The source is an electrode that supplies a carrier to the transistor. In the transistor, the carrier begins to flow from the source. The drain is an electrode through which the carrier is discharged to the outside from the transistor. In the transistor, the carrier flows from the source to the drain. Because the carrier is an electron in the case of an n-channel transistor, the source voltage has a lower voltage than the drain voltage so that the electron may flow from the source to the drain. In the n-channel transistor, the electric current flows from the drain toward the source. Because the carrier is a positive hole in the p-channel transistor (PMOS), a source voltage is higher than a drain voltage so that the positive hole may flow from the source to the drain. Because the positive hole flows from the source toward the drain in the p-channel transistor, the electric current flows from the source toward the drain. It should be noted that the source and the drain of the transistor are not fixed. For example, the source and the drain may vary depending on an applied voltage. Therefore, the present disclosure is not limited by the source and the drain of the transistor. In the present disclosure, for convenience, the source and the drain may refer to a source-drain electrode (SD electrode) without being distinguished from each other. The SD electrode may refer to any one of the source and the drain.

According to the embodiment of the present disclosure, the plurality of transistors may include a plurality of PMOS transistors and a plurality of NMOS transistors. For example, the plurality of transistors may include first to fourth NMOS transistors NT1, NT2, NT3, and NT4 and first to third PMOS transistors OT1, OT2, and OT3. The first to fourth NMOS transistors NT1, NT2, NT3, and NT4 may be implemented as PMOS transistors, and the first to third PMOS transistors OT1, OT2, and OT3 may be implemented as NMOS transistors. The present disclosure is not limited thereto. The PMOS transistor may be an oxide TFT. The present disclosure is not limited by the type of transistor.

With reference to FIG. 7, according to the embodiment of the present disclosure, at least one of gate incoming circuits may be configured to receive a VF enable signal, an LF enable signal, and an EM signal and output any one of the first start pulse HF VST and the second start pulse LF VST on the basis of the VF enable signal, the LF enable signal, and the EM signal. With reference back to FIG. 6, at least one of gate incoming circuits may be electrically connected to a VF enable line VEL configured to supply the VF enable signal and electrically connected to an LF enable line LEL configured to supply the LF enable signal.

As described below, the VF enable signal may be toggled from a high level to a low level by being synchronized with the toggling of the EM signal from a low level to a high level. According to the embodiment, the gate incoming circuit may output the first start pulse HF VST corresponding to the high-frequency operation in a section made before the LF enable signal decreases in electric potential from a time point at which the VF enable signal is toggled. The gate incoming circuit may output the second start pulse LF VST corresponding to the low-frequency operation in a section in which the LF enable signal decreases in electric potential. In addition, the gate incoming circuit may output a normal start pulse corresponding to the low-frequency operation before the VF enable signal is toggled. The gate incoming circuit may output the first start pulse HF VST corresponding to the high-frequency operation in response to the toggling of the VF enable signal.

Hereinafter, the embodiment of the present disclosure will be described in detail with reference to a detailed circuit diagram. In the present specification, output VST, which is supplied to the GIP circuit, may be supplied to the stage connected to the gate incoming circuit.

With reference to FIG. 7, according to the embodiment of the present disclosure, a variable frequency enable (VF enable) signal VF VST ENABLE, a low-frequency enable (LF enable) signal LF ENABLE, an HF start pulse HF VST, a front end stage output voltage SRO, the gate low voltage VGL, the gate high voltage VGH, and/or the EM signal EM Out are inputted to the gate incoming circuit.

A gate electrode of a first NMOS transistor NT1 receives the VF enable signal and is turned on or off by a voltage level of the VF enable signal. Any one of the SD electrodes of the first NMOS transistor NT1 may receive the EM signal, and another of the SD electrodes of the first NMOS transistor NT1 may be electrically connected to a second PMOS transistor OT2 and provide the EM signal to the gate electrode of the second PMOS transistor OT2.

A gate electrode of a first PMOS transistor OT1 receives the VF enable signal and is turned on or off by a voltage level of the VF enable signal. Any one of the SD electrodes of the first PMOS transistor OT1 may receive the gate low voltage VGL, and another of the SD electrodes of the first PMOS transistor OT1 may be electrically connected to the second PMOS transistor OT2 and provide the gate low voltage VGL to the gate electrode of the second PMOS transistor OT2. Meanwhile, any one of the SD electrodes of the first PMOS transistor OT1 may also be electrically connected to a gate electrode of a second NMOS transistor NT2. Therefore, the gate low voltage VGL may be simultaneously provided to the SD electrode of the first PMOS transistor OT1 and the gate electrode of the second NMOS transistor NT2.

The gate electrode of the first NMOS transistor NT1 and the gate electrode of the first PMOS transistor OT1 share one node and receive the VF enable signal from one node. The first NMOS transistor NT1 and the first PMOS transistor OT1 are different in polarities of channels. Therefore, when any one of the first NMOS transistor NT1 and the first PMOS transistor OT1 is turned on by the VF enable signal, the other of the first NMOS transistor NT1 and the first PMOS transistor OT1 is turned off.

The VF enable signal may be supplied through the VF enable line illustrated in FIG. 6. The VF enable line may be electrically connected to the gate incoming circuit and supply the VF enable signal to the gate incoming circuit.

The gate electrode of the second NMOS transistor NT2 is connected to the gate low voltage VGL, as described above. As the gate low voltage is applied, the second NMOS transistor NT2 is maintained in a turn-on state. Any one of the SD electrodes of the second NMOS transistor NT2 is electrically connected to the SD electrode of the first PMOS transistor OT1, and another of the SD electrodes of the second NMOS transistor NT2 is connected to a gate electrode of a third NMOS transistor NT3. A gate low voltage is transmitted to the SD electrode of the second NMOS transistor NT2 through the first PMOS transistor OT1 while the first PMOS transistor OT1 is maintained in the turn-on state. In this case, because the second NMOS transistor NT2 is maintained in the turn-on state, the gate low voltage is eventually provided as a gate voltage of the third NMOS transistor NT3 through the first PMOS transistor OT1 and the second NMOS transistor NT2.

As described above, the gate electrode of the second PMOS transistor OT2 is connected to the SD electrode of the first PMOS transistor OT1 and the SD electrode of the first NMOS transistor NT1 while sharing the node with the SD electrode of the first PMOS transistor OT1 and the SD electrode of the first NMOS transistor NT1. In addition, any one of the SD electrodes of the second PMOS transistor OT2 is connected to the HF VST, and another of the SD electrodes of the second PMOS transistor OT2 is connected to an SD electrode of a third PMOS transistor OT3 and the SD electrode of the third NMOS transistor NT3 while sharing the node with the SD electrode of the third PMOS transistor OT3 and the SD electrode of the third NMOS transistor NT3.

When the second PMOS transistor OT2 receives a low-level voltage of the EM signal EM out, the second PMOS transistor OT2 is maintained in a turn-off state. The HF VST is blocked by the second PMOS transistor OT2 while the second PMOS transistor OT2 is maintained in the turn-off state.

The second PMOS transistor OT2 operates in the turn-on state in response to the receiving of the EM signal EM out of a high-level voltage. The HF VST is provided to the SD electrode of the third PMOS transistor OT3 while the second PMOS transistor OT2 is maintained in the turn-on state. In case that the third PMOS transistor OT3 is in the turn-on state, the HF VST may be supplied to the GIP circuit as the output VST. In case that the third PMOS transistor OT3 is in the turn-off state, the supply of the HF VST may be cut off by the third PMOS transistor OT3.

The HF VST may be supplied through the HF VST line HVL illustrated in FIG. 6. The HF VST line may be electrically connected to the gate incoming circuit and supply the HF VST to the gate incoming circuit.

As described above, the gate electrode of the third NMOS transistor NT3 is connected to the SD electrode of the second NMOS transistor NT2. In addition, any one of the SD electrodes of the second NMOS transistor NT2 is connected to the SRO, and another of the SD electrodes of the second NMOS transistor NT2 is connected to the second PMOS transistor OT2 and the SD electrode of the third PMOS transistor while sharing the node.

The third NMOS transistor NT3 provides a signal, which corresponds to the SRO, to the SD electrode of the third PMOS transistor OT3 while the third NMOS transistor NT3 is maintained in the turn-on state. In case that the third PMOS transistor OT3 is maintained in the turn-on state, the signal corresponding to the SRO may become the VST through the third NMOS transistor NT3 (i.e., the signal may be supplied to the GIP circuit as the output VST).

The gate electrode of the third PMOS transistor OT3 receives the LF enable signal and is turned on or off by the LF enable signal. Any one of the SD electrodes of the third PMOS transistor OT3 is connected to the second PMOS transistor OT2 and the SD electrode of the third NMOS transistor NT3, and another of the SD electrodes of the third PMOS transistor OT3 is connected to the GIP circuit (or any one of the plurality of stages of the GIP circuit).

The second PMOS transistor OT2 may supply the signal, which corresponds to the HF VST, to the SD electrode of the third PMOS transistor OT3, and the third NMOS transistor NT3 may supply the signal, which corresponds to the SRO, to the SD electrode of the third PMOS transistor OT3. The third PMOS transistor OT3 may supply the signal, which corresponds to the HF VST, or any one of the signals, which correspond to the SRO, to the GIP circuit as the output VST while the third PMOS transistor OT3 is maintained in the turn-on state.

A gate electrode of a fourth NMOS transistor NT4 receives the LF enable signal and is turned on or off by the LF enable signal. Any one of the SD electrodes of the fourth NMOS transistor NT4 is connected to the VGH, and another of the SD electrodes of the fourth NMOS transistor NT4 is connected to the GIP circuit (or any one of the plurality of stages of the GIP circuit). The gate electrode of the fourth NMOS transistor NT4 may share substantially the same node with the gate electrode of the third PMOS transistor OT3. Therefore, the fourth NMOS transistor NT4 may be turned off while the third PMOS transistor OT3 is turned on, and the fourth NMOS transistor NT4 may be turned on while the third PMOS transistor OT3 is turned off.

The LF enable signal may be supplied through the LF enable line LEL illustrated in FIG. 6. The LF enable line may be electrically connected to the gate incoming circuit and supply the LF enable signal to the gate incoming circuit.

With reference to FIGS. 7 and 8A, the display device according to the embodiment of the present disclosure operates with a normal VST in the first frame. In the first frame, the display device operates at a driving frequency corresponding to the normal VST from the first gate line to the final gate line.

Figure 9A:
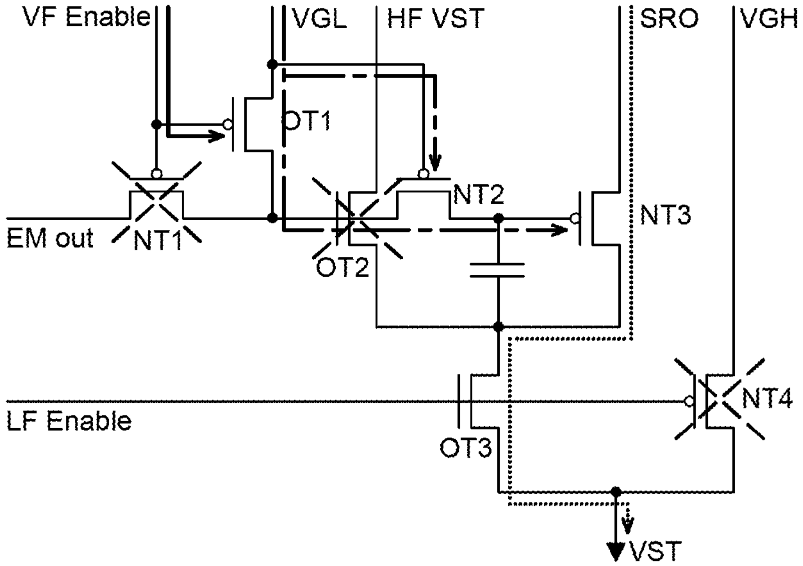
FIGS. 9A to 9D are views for explaining an operational sequence of the gate incoming circuit according to the embodiment of the present disclosure.

With reference to FIGS. 7, 8A, and 9A, in the first frame, the VF enable signal and the LF enable signal are controlled by a DC high-level voltage.

As the VF enable signal is controlled by the DC high-level voltage, the first NMOS transistor NT1 is turned off, and the first PMOS transistor OT1 is turned on. The gate low voltage turns on the third NMOS transistor NT3 through the first PMOS transistor OT1 and the second NMOS transistor NT2. In this case, the second NMOS transistor NT2 is in the turn-on state by the gate low voltage. As the third NMOS transistor NT3 is turned on, the signal corresponding to the SRO may be outputted as the VST and supplied to the stage. The signal corresponding to the SRO may be an output of the front end stage of the stage to which the VST is supplied.

In addition, in the first frame, the LF enable signal is controlled by the DC high-level voltage, such that the third PMOS transistor OT3 is turned on, and the fourth NMOS transistor NT4 is turned off. The signal corresponding to the VGH cannot be outputted as the fourth NMOS transistor NT4 is turned off, and the signal corresponding to the SRO is outputted as the output VST as the third PMOS transistor OT3 is turned on.

With reference to FIGS. 7 and 8A, in the second frame, the VF enable signal decreases in electric potential (high to low) in a particular gate line. As the VF enable signal decreases in electric potential in the particular gate line, the gate incoming circuit operates as a logic circuit from the second frame. In the following description, it is assumed that the second frame operates at a low frequency from the first gate line to an (M−1)th gate line, operates at a high frequency from an M-th gate line to an (N−1)th gate line, and operates at a low frequency again from an N-th gate line to a final gate line.

Figure 9B:
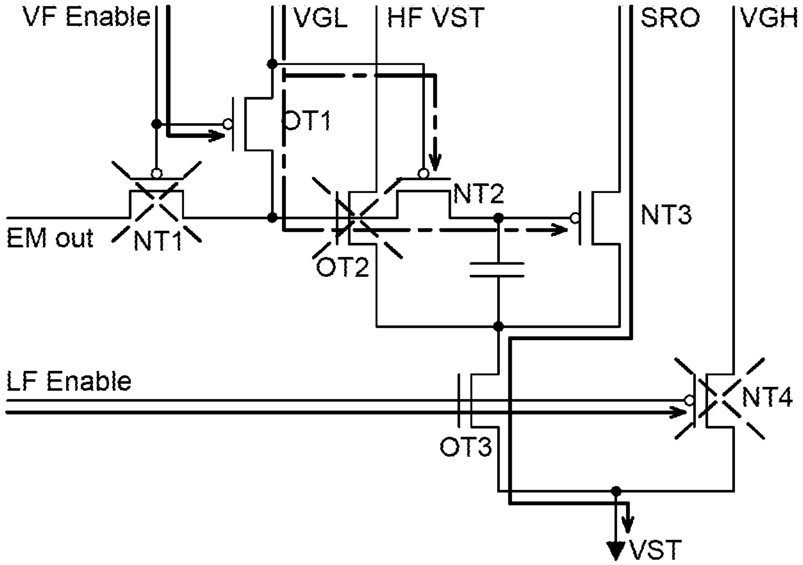

With reference to FIGS. 7, 8A, and 9B, in the second frame, the VF enable signal is supplied as a high-level voltage, the LF enable signal is supplied as a high-level voltage, and the EM signal is supplied as a low-level voltage to the gate incoming circuit from the first gate line to the (M−1)th gate line.

By the VF enable signal of the high-level voltage, the first PMOS transistor OT1 is turned on, and the first NMOS transistor NT1 is turned off. By the LF enable signal of the high-level voltage, the third PMOS transistor OT3 is turned on, and the fourth NMOS transistor NT4 is turned off.

The signal corresponding to the gate low voltage is inputted to the second PMOS transistor OT2 and the third NMOS transistor NT3 through the first PMOS transistor OT1. In addition, the signal corresponding to the gate low voltage is inputted directly to the second NMOS transistor NT2 without passing through the first PMOS transistor OT1. By the signal corresponding to the gate low voltage, the second PMOS transistor OT2 is turned off, the second NMOS transistor NT2 is turned on, and the third NMOS transistor NT3 is turned on.

The signal corresponding to the HF VST is blocked as the second PMOS transistor OT2 is turned off, and the signal corresponding to the gate high voltage is blocked as the fourth NMOS transistor NT4 is turned off. As the third NMOS transistor NT3 is turned on, the signal corresponding to the SRO is outputted as the output VST through the third PMOS transistor OT3.

As described above, the gate incoming circuit outputs the output of the front end stage as the VST with respect to the stage before the VF enable signal is toggled from the high-level voltage to the low-level voltage. Therefore, when the driving frequency of the gate line of the front end stage is a low frequency, the driving frequency may be maintained in an intact manner.

Figure 9C:
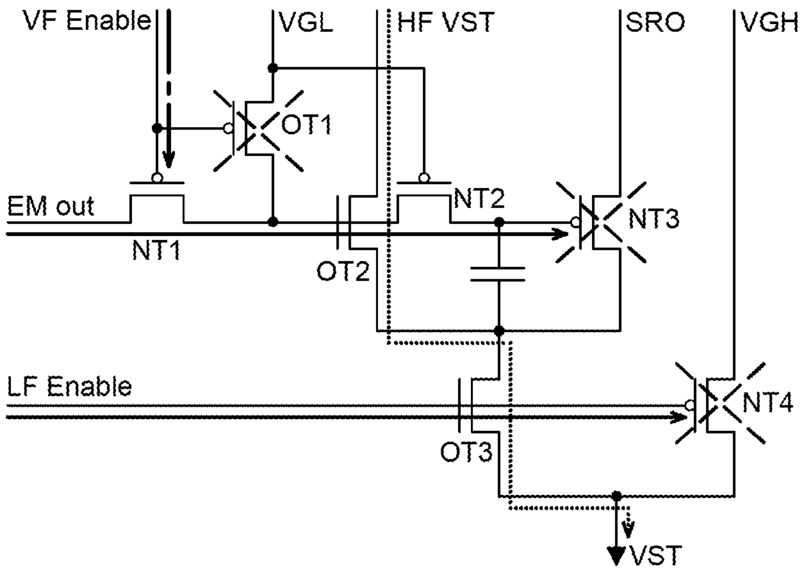

With reference to FIGS. 7, 8A, and 9C, in the second frame, the VF enable signal is supplied as a low-level voltage, the LF enable signal is supplied as a high-level voltage, and the EM signal is supplied as a high-level voltage to the gate incoming circuit in the M-th gate line. The VF enable signal is toggled by being synchronized with the toggling of the EM signal. The VF enable signal is toggled (decreases in electric potential) from the high-level voltage to the low-level voltage at the same time when the EM signal is toggled (increases in electric potential) from the low-level voltage to the high-level voltage.

By the VF enable signal of the low-level voltage, the first NMOS transistor NT1 is turned on, and the first PMOS transistor OT1 is turned off. By the LF enable signal of the high-level voltage, the third PMOS transistor OT3 is turned on, and the fourth NMOS transistor NT4 is turned off.

The second NMOS transistor NT2 is turned on by the signal corresponding to the gate low voltage.

The EM signal of the high-level voltage is inputted to the second PMOS transistor OT2 and the third NMOS transistor NT3 through the first NMOS transistor NT1, the second PMOS transistor OT2 is turned on, and the third NMOS transistor NT3 is turned off. As the third NMOS transistor NT3 is turned off, the supply of the signal corresponding to the SRO is cut off. As the second PMOS transistor OT2 is turned on, the signal corresponding to the HF VST is outputted as the output VST through the third PMOS transistor OT3.

As described above, in response to the toggling of the VF enable signal and the EM signal, the gate incoming circuit may block the signal, which corresponds to the SRO and has been outputted as the output VST to the front end stage, and newly output the signal corresponding to the HF VST as the output VST. As a result, the gate lines after the M-th gate line operate at a high frequency before the LF enable signal decreases in electric potential.

With reference back to FIGS. 7, 8A, and 9B, in the second frame, the gate incoming circuit outputs the signal, which corresponds to the SRO signal of the front end stage, as the output VST before the LF enable signal decreases in electric potential. The VF enable signal is supplied as a high-level voltage, the LF enable signal is supplied as a high-level voltage, and the EM signal is supplied as a low-level voltage to the gate incoming circuit from the (M+1)th gate line to the (N−1)th gate line. Therefore, as the second PMOS transistor OT2 and the fourth NMOS transistor NT4 are turned off, the signal, which corresponds to the HF VST, and the signal, which corresponds to the VGH, are blocked, and the signal corresponding to the SRO is supplied as the output VST to the connected stage. As a result, the display area from the (M+1)th gate line to the (N−1)th gate line operates at a high frequency.

Figure 9D:
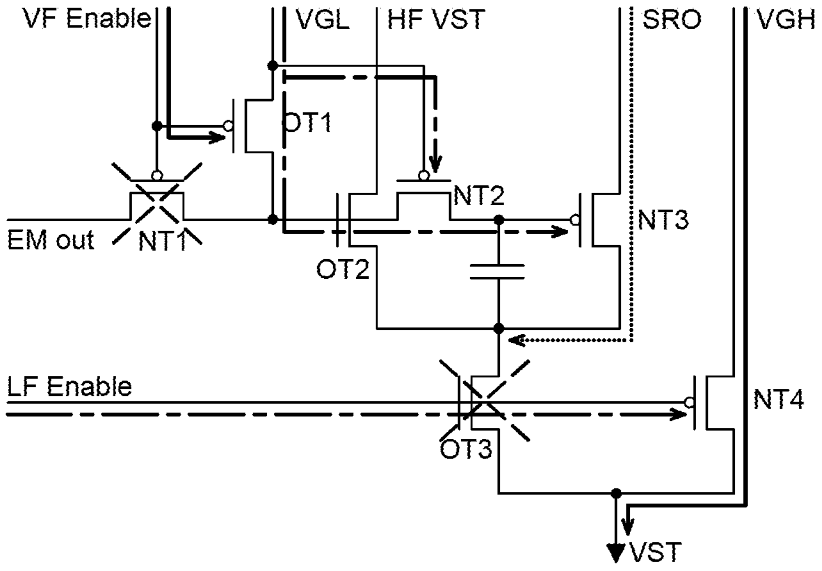

With reference to FIGS. 7, 8A, and 9D, in the second frame, the VF enable signal is supplied as a high-level voltage, the LF enable signal is supplied as a low-level voltage, and the EM signal is supplied as a low-level voltage to the gate incoming circuit from the N-th gate line to the final gate line. The LF enable signal decreases in electric potential in the N-th gate line, and the LF enable signal is maintained as a low-level voltage from the N-th gate line to the final gate line.

By the LF enable signal of the low-level voltage, the third PMOS transistor OT3 is turned off, and the fourth NMOS transistor NT4 is turned on. As the third PMOS transistor OT3 is turned off, the signal corresponding to the SRO output is blocked and cannot be outputted as the output VST. As the fourth NMOS transistor NT4 is turned on, the signal corresponding to the VGH is outputted as the output VST. The display area of the N-th gate line, to which the signal corresponding to the VGH is inputted, may operate at a low frequency.

As described above, the gate incoming circuit may include the first PMOS transistor OT1 configured to provide the signal corresponding to the shift register output (SRO) of the front end stage to the shared node in response to the high-level VF enable signal, and the first NMOS transistor NT1 configured to provide the first start pulse corresponding to the high-frequency operation to the shared node in response to the low-level VF enable signal. The signal or first start pulse corresponding to the SRO provided to the shared node may be outputted to the stage connected to the gate incoming circuit while the LF enable signal is maintained at a high level. In the section in which the LF enable signal is maintained at a low level, the signal or first start pulse corresponding to the SRO provided to the shared node may not be outputted to the stage, and the second start pulse corresponding to the low-frequency operation may be outputted to the stage connected to the gate incoming circuit.

In the embodiment, in the section in which the LF enable signal is supplied to the third PMOS transistor OT3 and the gate electrode of the fourth NMOS transistor NT4 and the LF enable signal is maintained at a high level, the third PMOS transistor OT3 may be turned on, and the start pulse, which is outputted to the connected stage, may be determined as the signal provided to the shared node. In addition, in the section in which the LF enable signal is maintained at a low level, the fourth NMOS transistor NT4 may be turned on, and the start pulse, which is outputted to the connected stage, may be determined as the second start pulse corresponding to the low-frequency operation.

As described above, the gate incoming circuit according to the embodiment of the present disclosure may operate at a low frequency from the first gate line to the (M−1)th gate line, operate the display area, which corresponds to the section from the M-th gate line to the (N−1)th gate line, at a high frequency by using the VF enable signal synchronized with the EM signal, and operate the display area, which corresponds to the section from the N-th gate line to the final gate line, at a low frequency again by using the LF enable signal. The display device according to the embodiment of the present disclosure may change, as necessary, the display area, which operates at a high frequency, and the display area, which operates at a low frequency, by using the gate incoming circuit.

FIG. 8B exemplarily illustrates an operating method of continuously maintaining the LF enable signal at the DC high level. With reference to FIGS. 7, 8B, and 9A to 9D, in case that the LF enable signal is maintained at the DC high level, the display area may be specified as the display area, which operates at a low frequency, and the display area that operates at a high frequency. Because the LF enable signal does not decrease in electric potential, the display area may operate at a high frequency from the particular gate line, on which the VF enable signal and the EM signal are toggled, to the final gate line.

Meanwhile, in the above-mentioned embodiments, the case has been exemplarily described in which the driving frequency corresponding to the normal VST is a low-frequency. However, the driving frequency corresponding to the normal VST may be a high frequency. That is, in the first frame that operates in accordance with the normal VST, the display device may operate at a high frequency on the basis of the normal VST. This case will be described below with reference to FIG. 8C.

FIG. 8C exemplarily illustrates an operating method of continuously maintaining the VF enable signal at the DC high level. The display device according to the embodiment may operate the display area at a high frequency in response to the supply of the normal VST to the GIP circuit.

With reference to FIGS. 7, 8C, and 9A to 9D, the VF enable signal is maintained at the DC high-level voltage in the entire gate line of the second frame. Therefore, the first NMOS transistor NT1 and the second PMOS transistor OT2 are turned off, and the first PMOS transistor OT1, the second NMOS transistor NT2, and the third NMOS transistor NT3 are turned on. Therefore, the gate incoming circuit may output the signal corresponding to the SRO as the output VST while the LF enable signal is supplied at a high-level voltage. The gate incoming circuit may output the signal corresponding to the VGH as the output VST when the LF enable signal decreases in electric potential at a low level voltage. In case that the LF enable signal decreases in electric potential in the N-th gate line, the display area, which corresponds to the section from the first gate line to the (N−1)th gate line of the second frame, may operate at a high frequency, and the display area, which corresponds to the section from the N-th gate line to the final gate line, may operate at a low frequency.

The example embodiments of the present disclosure can also be described as follows:

A gate driver according to an embodiment of the present disclosure may include a plurality of dependently connected stages; and at least one of gate incoming circuits configured to selectively output any one of a first start pulse corresponding to a high-frequency operation and a second start pulse corresponding to a low-frequency operation, wherein at least one of the plurality of stages are connected to the gate incoming circuit and receive any one of the first start pulse and the second start pulse outputted by the gate incoming circuit.

The at least one of gate incoming circuits may be dependently connected to an output of the stage positioned at a front end based on the stage to which the at least one of gate incoming circuits may be connected.

The at least one of gate incoming circuits may receive a VF enable signal, an LF enable signal, and an EM signal and may be configured to output any one of the first start pulse and the second start pulse on the basis of the VF enable signal, the LF enable signal, and the EM signal.

The at least one of gate incoming circuits may be electrically connected to a VF enable line configured to supply the VF enable signal, and an LF enable line configured to supply the LF enable signal.

The VF enable signal may be toggled from a high level to a low level by being synchronized with toggling of the EM signal from a low level to a high level.

The gate incoming circuit may output the first start pulse corresponding to the high-frequency operation in a section made before the LF enable signal decreases in electric potential from a time point at which the VF enable signal may be toggled.

The gate incoming circuit may output the second start pulse corresponding to the low-frequency operation in a section in which the LF enable signal decreases in electric potential.

The gate incoming circuit may output a normal start pulse corresponding to the low-frequency operation before the VF enable signal may be toggled, and the gate incoming circuit may output the first start pulse corresponding to the high-frequency operation in response to toggling of the VF enable signal.

The gate incoming circuit may comprise a first PMOS transistor configured to provide a signal, which corresponds to a shift register output (SRO) of a front end stage, to a shared node in response to a high-level VF enable signal; and a first NMOS transistor configured to provide the first start pulse, which corresponds to the high-frequency operation, to the shared node in response to a low-level VF enable signal, and wherein the signal or the first start pulse corresponding to the SRO provided to the shared node may be outputted to the connected stage while the LF enable signal may be maintained at a high level.

In a section in which the LF enable signal may be maintained at a low level, the signal or the first start pulse corresponding to the SRO provided to the shared node may be not outputted to the stage, and the second start pulse corresponding to the low-frequency operation may be outputted to the connected stage.

The LF enable signal may be supplied to a second PMOS transistor and a gate electrode of a second NMOS transistor, the second PMOS transistor may be turned on in a section in which the LF enable signal may be maintained at a high level, and the start pulse outputted to the connected stage may be determined as a signal provided to the shared node.

The second NMOS transistor may be turned on in the section in which the LF enable signal may be maintained at the low level, and the start pulse outputted to the connected stage may be determined as the second start pulse corresponding to the low-frequency operation.

A display device according to another embodiment of the present disclosure may include: a display panel comprising a display area; a plurality of dependently connected stages; at least one of gate incoming circuits configured to selectively output any one of a first start pulse corresponding to a high-frequency operation and a second start pulse corresponding to a low-frequency operation; and a controller configured to control a gate driver, wherein at least one of the plurality of stages are connected to the gate incoming circuit and receive any one of the first start pulse and the second start pulse outputted by the gate incoming circuit.

The at least one of gate incoming circuits may be dependently connected to an output of the stage positioned at a front end based on the stage to which the at least one of gate incoming circuits may be connected.

The at least one of gate incoming circuits may receive a VF enable signal, an LF enable signal, and an EM signal and may be configured to output any one of the first start pulse and the second start pulse on the basis of the VF enable signal, the LF enable signal, and the EM signal.

The at least one of gate incoming circuits may be electrically connected to a VF enable line configured to supply the VF enable signal, and an LF enable line configured to supply the LF enable signal.

The VF enable signal may be toggled from a high level to a low level by being synchronized with toggling of the EM signal from a low level to a high level.

The gate incoming circuit may output the first start pulse corresponding to the high-frequency operation in a section made before the LF enable signal decreases in electric potential from a time point at which the VF enable signal may be toggled.

The gate incoming circuit may output the second start pulse corresponding to the low-frequency operation in a section in which the LF enable signal decreases in electric potential.

The gate incoming circuit may output a normal start pulse corresponding to the low-frequency operation before the VF enable signal may be toggled, and the gate incoming circuit may output the first start pulse corresponding to the high-frequency operation in response to toggling of the VF enable signal.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. All the technical concepts in the equivalent scope of the present disclosure should be construed as falling within the scope of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gate driver, comprising:

a plurality of stages dependently connected to one another; and at least one of gate incoming circuits configured to selectively output one of a first start pulse corresponding to a high-frequency operation or a second start pulse corresponding to a low-frequency operation, wherein at least one of the plurality of stages are connected to the gate incoming circuit and receive the one of the first start pulse or the second start pulse outputted by the gate incoming circuit, and wherein the at least one of gate incoming circuits is configured to receive a VF enable signal, an LF enable signal, and an EM signal and are configured to output one of the first start pulse or the second start pulse on the basis of the VF enable signal, the LF enable signal, and the EM signal.

2. The gate driver of claim 1, wherein the at least one of gate incoming circuits is dependently connected to an output of a stage positioned at a front end based on a stage to which the at least one of gate incoming circuits is connected.

3. The gate driver of claim 1, wherein the at least one of gate incoming circuits is electrically connected to a VF enable line configured to supply the VF enable signal, and an LF enable line configured to supply the LF enable signal.

4. The gate driver of claim 3, wherein the gate incoming circuit comprises:

a first PMOS transistor configured to provide a signal, which corresponds to a shift register output (SRO) of a front end stage, to a shared node in response to a high-level VF enable signal; and a first NMOS transistor configured to provide the first start pulse, which corresponds to the high-frequency operation, to the shared node in response to a low-level VF enable signal, and wherein the signal or the first start pulse corresponding to the SRO provided to the shared node is outputted to the connected stage while the LF enable signal is maintained at a high level.

5. The gate driver of claim 4, wherein in a section in which the LF enable signal is maintained at a low level, the signal or the first start pulse corresponding to the SRO provided to the shared node is not outputted to the stage, and the second start pulse corresponding to the low-frequency operation is outputted to the connected stage.

6. The gate driver of claim 5, wherein the LF enable signal is connected to be supplied to a second PMOS transistor and a gate electrode of a second NMOS transistor, the second PMOS transistor is configured to be turned on in a section in which the LF enable signal is maintained at a high level, and the start pulse outputted to the connected stage is a signal provided to the shared node.

7. The gate driver of claim 6, wherein the second NMOS transistor is turned on in the section in which the LF enable signal is maintained at the low level, and the start pulse outputted to the connected stage is determined as the second start pulse corresponding to the low-frequency operation.

8. The gate driver of claim 1, wherein the VF enable signal is configured to be toggled from a high level to a low level by being synchronized with toggling of the EM signal from a low level to a high level.

9. The gate driver of claim 8, wherein the gate incoming circuit is configured to output the first start pulse corresponding to the high-frequency operation in a section before the LF enable signal decreases in electric potential from a time point at which the VF enable signal is toggled.

10. The gate driver of claim 8, wherein the gate incoming circuit is configured to output the second start pulse corresponding to the low-frequency operation in a section in which the LF enable signal decreases in electric potential.

11. The gate driver of claim 8, wherein the gate incoming circuit is configured to output a normal start pulse corresponding to the low-frequency operation before the VF enable signal is toggled, and the gate incoming circuit is configured to output the first start pulse corresponding to the high-frequency operation in response to toggling of the VF enable signal.

12. A display device, comprising:

a display panel comprising a display area;

a plurality of stages dependently connected to one another;

at least one of gate incoming circuits configured to selectively output one of a first start pulse corresponding to a high-frequency operation or a second start pulse corresponding to a low-frequency operation; and a controller configured to control a gate driver, wherein at least one of the plurality of stages is connected to the gate incoming circuit to receive the one of the first start pulse or the second start pulse outputted by the gate incoming circuit, and wherein the at least one of gate incoming circuits is configured to receive a VF enable signal, an LF enable signal, and an EM signal and are configured to output one of the first start pulse or the second start pulse on the basis of the VF enable signal, the LF enable signal, and the EM signal.

13. The display device of claim 12, wherein the at least one of gate incoming circuits is dependently connected to an output of a stage positioned at a front end based on a stage to which the at least one of gate incoming circuits are connected.

14. The display device of claim 12, wherein the at least one of gate incoming circuits is electrically connected to a VF enable line configured to supply the VF enable signal, and an LF enable line configured to supply the LF enable signal.

15. The display device of claim 12, wherein the VF enable signal is configured to be toggled from a high level to a low level by being synchronized with toggling of the EM signal from a low level to a high level.

16. The display device of claim 15, wherein the gate incoming circuit is configured to output the first start pulse corresponding to the high-frequency operation in a section before the LF enable signal decreases in electric potential from a time point at which the VF enable signal is toggled.

17. The display device of claim 15, wherein the gate incoming circuit is configured to output the second start pulse corresponding to the low-frequency operation in a section in which the LF enable signal decreases in electric potential.

18. The display device of claim 15, wherein the gate incoming circuit is configured to output a normal start pulse corresponding to the low-frequency operation before the VF enable signal is toggled, and the gate incoming circuit is configured to output the first start pulse corresponding to the high-frequency operation in response to toggling of the VF enable signal.

* * * * *